(12) United States Patent
Jung et al.

(10) Patent No.: US 10,791,587 B2
(45) Date of Patent: Sep. 29, 2020

(54) V2X OPERATION METHOD PERFORMED BY TERMINAL IN WIRELESS COMMUNICATION SYSTEM AND TERMINAL USING SAME

(71) Applicant: LG ELECTRONICS INC., Seoul (KR)

(72) Inventors: Sunghoon Jung, Seoul (KR); Youngdae Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 43 days.

(21) Appl. No.: 16/075,554

(22) PCT Filed: Feb. 6, 2017

(86) PCT No.: PCT/KR2017/001286
§ 371 (c)(1),
(2) Date: Aug. 3, 2018

(87) PCT Pub. No.: WO2017/135784
PCT Pub. Date: Aug. 10, 2017

(65) Prior Publication Data
US 2019/0045576 A1    Feb. 7, 2019

Related U.S. Application Data

(60) Provisional application No. 62/292,203, filed on Feb. 5, 2016.

(51) Int. Cl.
*H04W 76/27*     (2018.01)
*H04W 76/18*     (2018.01)
(Continued)

(52) U.S. Cl.
CPC ............. *H04W 76/27* (2018.02); *H04W 4/40* (2018.02); *H04W 36/04* (2013.01); *H04W 48/20* (2013.01);
(Continued)

(58) Field of Classification Search
None
See application file for complete search history.

(56) References Cited

U.S. PATENT DOCUMENTS

2012/0196603 A1* 8/2012 Mochizuki ............ H04W 48/02
455/436
2013/0136007 A1    5/2013 Jiang et al.
(Continued)

FOREIGN PATENT DOCUMENTS

WO    2015065085    5/2015

OTHER PUBLICATIONS

PCT International Application No. PCT/KR2017/001286, International Search Report dated May 16, 2017, 4 pages.
(Continued)

*Primary Examiner* — Ruihua Zhang
(74) *Attorney, Agent, or Firm* — Lee, Hong, Degerman, Kang & Waimey PC

(57) ABSTRACT

The present invention provides a vehicle-to-X (V2X) operation method performed by a terminal in a wireless communication system, including: when a V2X transmission failure is detected, starting a timer as soon as a radio resource control (RRC) connection re-establishment procedure is initiated; and performing a V2X transmission on the basis of the timer, wherein, when the timer is in operation and the RRC connection re-establishment procedure is performed, the terminal performs the V2X transmission on a transmission resource which has been set before the V2X transmission failure is detected.

5 Claims, 17 Drawing Sheets

(51) Int. Cl.
    *H04W 76/19*   (2018.01)
    *H04W 4/40*    (2018.01)
    *H04W 36/04*   (2009.01)
    *H04W 76/20*   (2018.01)
    *H04W 76/10*   (2018.01)
    *H04W 48/20*   (2009.01)
    *H04W 36/00*   (2009.01)
    *H04W 76/38*   (2018.01)

(52) U.S. Cl.
    CPC ........... *H04W 76/10* (2018.02); *H04W 76/18* (2018.02); *H04W 76/19* (2018.02); *H04W 76/20* (2018.02); *H04W 36/0079* (2018.08); *H04W 36/0083* (2013.01); *H04W 76/38* (2018.02)

(56) References Cited

U.S. PATENT DOCUMENTS

| | | | |
|---|---|---|---|
| 2014/0269604 A1 | 9/2014 | Kamiya et al. | |
| 2015/0271861 A1* | 9/2015 | Li | H04W 56/001 |
| | | | 455/426.1 |
| 2015/0271868 A1* | 9/2015 | Rune | H04W 24/10 |
| | | | 370/311 |
| 2015/0282234 A1* | 10/2015 | Sartori | H04W 72/042 |
| | | | 370/329 |
| 2017/0208640 A1* | 7/2017 | Kim | H04W 76/14 |
| 2018/0115930 A1* | 4/2018 | Belleschi | H04W 36/0072 |

OTHER PUBLICATIONS

3rd Generation Partnership Project; Technical Specification Group Radio Access Network; Evolved Universal Terrestrial Radio Access (E-UTRA); Radio Resource Control (RRC); Protocol specification (Release 13), 3GPP TS 36.331 V13.0.0, Dec. 2015, 507 pages.

Jeong-Hwan Lee, et al., "A Study of the Radio Resource Control Connection Re-establishment Procedure on the UE side in 3GPP", IEEE, Advanced Communication Technology, ISBN 978-89-968650-4-9, Aug. 2015.

* cited by examiner

V2X OPERATION METHOD PERFORMED BY TERMINAL IN WIRELESS COMMUNICATION SYSTEM AND TERMINAL USING SAME

CROSS-REFERENCE TO RELATED APPLICATIONS

This application is the National Stage filing under 35 U.S.C. 371 of International Application No. PCT/KR2017/001286, filed on Feb. 6, 2017, which claims the benefit of U.S. Provisional Application No. 62/292,203, filed on Feb. 5, 2016, the contents of which are all hereby incorporated by reference herein in their entirety.

BACKGROUND OF THE INVENTION

Field of the Invention

The present invention relates to wireless communication and, more particularly, to a vehicle-to-X (V2X) operation method performed by a terminal in a wireless communication system and a terminal using the same.

Related Art

The International Telecommunication Union Radio communication sector (ITU-R) is carrying out a standardization process of International Mobile Telecommunication (IMT)-Advanced, which is a next generation mobile communication system developed after the $3^{rd}$ generation mobile communication system. The IMT-Advanced seeks to achieve the goal of providing Internet Protocol (IP)-based multimedia service support at a data transmission rate of 1 Gbps in an immobile state and a low-speed mobile state, and 100 Mbps in a high-speed mobile state.

As a system standard satisfying the requirements of the IMT-Advanced, the 3rd Generation Partnership Project (3GPP) is preparing for LTE-Advanced (LTE-A), which corresponds to an enhanced version of the Long Term Evolution (LTE) that is based on the Orthogonal Frequency Division Multiple Access (OFDMA)/Single Carrier-Frequency Division Multiple Access (SC-FDMA) transmission schemes. The LTE-A is one of the most promising candidates for the IMT-Advanced.

Interest has recently been growing in the Device-to-Device (D2D) technology, wherein direct communication is carried out between devices. Most particularly, D2D is drawing attention as the communication technology that is suitable for public safety network. Although the commercial communication network is quickly shifting to LTE, due to the problem of collision with the legacy communication standard and the issue of cost, the current public safety network is still mostly based on the 2G technology. Such gap between the communication technologies and demand for more enhanced services are now leading to efforts in seeking to enhance the public safety network.

In comparison with the commercial communication network, the public safety network has a higher service requirement condition (reliability and security), and, most particularly, even when the coverage of cellular communication is out of reach or is unavailable, the public safety network still requires direct transmission and reception of signals between devices, i.e., D2D operation.

The D2D operation may have diverse advantages in the aspect of performing signal transmission/reception between close-ranged devices. For example, a D2D device (or D2D UE) may perform data communication at a high transmission rate with low latency. Also, the D2D operation may disperse (or distribute) the traffic being concentrated to the base station, and, if the D2D UE performs the functions of a relay station, the D2D UE may also perform the function of expanding the coverage of the base station. In particular, communication associated with vehicles including signal transmission/reception between vehicles due to extension of the D2D communication refers to Vehicle-to-X (V2X) communication.

When a problem (for example, radio connection failure and the like) occurs in radio resource control (RRC) connection, the terminal performs a RRC connection re-establishment procedure. In order to recover the connection, it takes a long time for the terminal to perform the RRC connection re-establishment procedure. The time taken for the terminal to perform the RRC connection re-establishment procedure may not be a minor time.

Accordingly, the present invention provides a method cable of performing V2X transmission when the UE is performing the RRC connection re-establishment procedure or the UE is in an RRC idle state and a device using the same.

SUMMARY OF THE INVENTION

The present invention provides a V2X operation method performed by a terminal in a wireless communication system and a terminal using the same.

In an aspect, a method for vehicle-to-X (V2X) operation in a wireless communication system is provided. The method may be performed by a user equipment (UE) and comprise starting a timer when a V2X transmission failure is detected, and performing V2X transmission on the basis of the timer. When the timer is in operation, the UE may perform the V2X transmission on a transmission resource which has been set before the V2X transmission failure is detected.

The V2X transmission failure may comprise a radio link failure, and the timer stars as soon as the RRC connection re-establishment procedure is initiated, and when the timer is in operation and the RRC connection re-establishment procedure is performed, the UE may perform the V2X transmission on a transmission resource which has been set before the V2X transmission failure is detected.

The method may further comprise entering an RRC idle mode by the UE when the timer is expired, wherein when the UE enters the RRC idle mode, the UE performs the V2X transmission on a transmission resource which has been set before the radio link failure is detected.

The method may further comprise entering an RRC idle mode when the timer is expired, and entering an RRC connection mode using a configuration before entering the RRC idle mode, after entering the RRC connection mode, the UE performs the V2X transmission on a transmission resource which has been set before the radio link failure is detected.

The timer may be configured through dedicated signaling from a network.

The timer may have a value of zero.

The transmission resource which has been set before the V2X transmission failure is detected may comprise a resource assigned by a serving cell before the UE detects the radio link failure.

The resource assigned by a serving cell before the UE detects the radio link failure may comprise a periodically assigned resource.

The transmission resource which has been set before the V2X transmission failure is detected comprises a resource assigned by one of a plurality of serving cells before the radio link failure is detected.

When the radio link failure is detected, an access stratum (AS) layer of the UE may not report that the radio link failure is detected to a non-access stratum (NAS) of the UE.

The UE may be in an RRC idle state and in an Evolved packet system Connection Management (ECM) connection state.

The timer may comprise a timer associated with T311.

The V2X transmission failure may comprise handover, the timer starts as soon as the handover is initiated, and when the timer is in operation and the handover is performed, the UE performs the V2X transmission which has been set before the handover is performed.

The timer may comprise a timer associated with T304.

In another aspect, a user equipment (UE) is provided. The UE may comprise an RF transceiver configured to send and receive radio signals, and a processor connected to the RF transceiver to be operated, the processor may start a timer when a vehicle to X (V2X) transmission failure is detected, and perform V2X transmission on the basis of the timer. When the timer is in operation, the UE may perform the V2X transmission on a transmission resource which has been set before the V2X transmission failure is detected.

According to the present invention, a V2X operation method performed by a terminal in a wireless communication system and a terminal using the same are provided.

According to the present invention, when the terminal performs the RRC re-establishment procedure, the terminal may perform V2X transmission. Further, the terminal does not detect a suitable cell to be in an RRC idle state, the terminal may perform V2X transmission. In addition, when the terminal is in an RRC idle state, the terminal may rapidly recover RRC connection using configuration received from an existing connected cell. Accordingly, the terminal according to the present invention may continuously perform V2X transmission. The terminal may stably perform V2X in a V2X communication situation in which a radio environment is rapidly changed.

DESCRIPTION OF EXEMPLARY EMBODIMENTS

Figure 1:
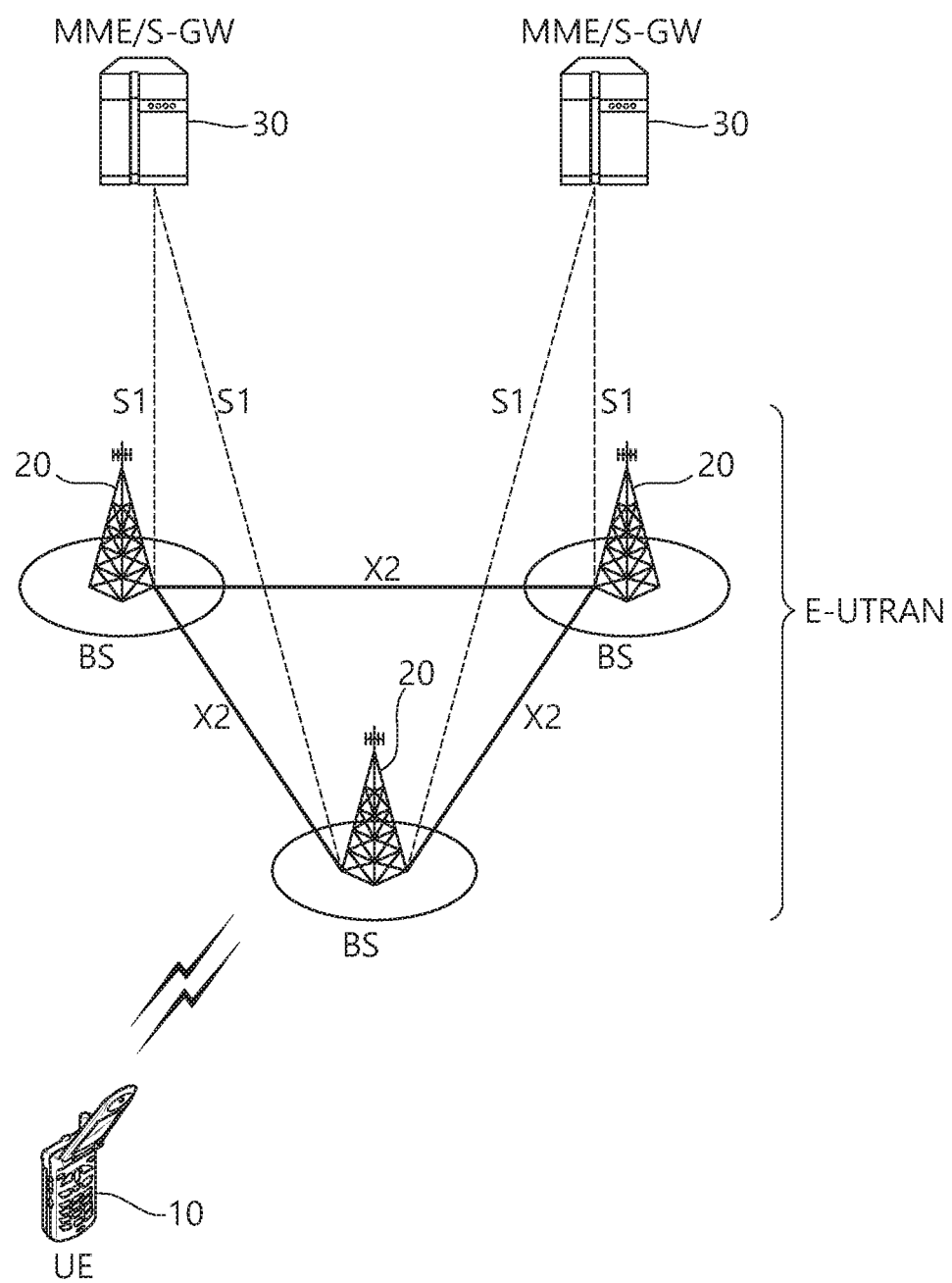
FIG. 1 shows a wireless communication system to which the present invention is applied.

FIG. 1 shows a wireless communication system to which the present invention is applied. The wireless communication system may also be referred to as an evolved-UMTS terrestrial radio access network (E-UTRAN) or a long term evolution (LTE)/LTE-A system.

The E-UTRAN includes at least one base station (BS) 20 which provides a control plane and a user plane to a user equipment (UE) 10. The UE 10 may be fixed or mobile, and may be referred to as another terminology, such as a mobile station (MS), a user terminal (UT), a subscriber station (SS), a mobile terminal (MT), a wireless device, etc. The BS 20 is generally a fixed station that communicates with the UE 10 and may be referred to as another terminology, such as an evolved node-B (eNB), a base transceiver system (BTS), an access point, etc.

The BSs 20 are interconnected by means of an X2 interface. The BSs 20 are also connected by means of an S1 interface to an evolved packet core (EPC) 30, more specifically, to a mobility management entity (MME) through S1-MME and to a serving gateway (S-GW) through S1-U.

The EPC 30 includes an MME, an S-GW, and a packet data network-gateway (P-GW). The MME has access information of the UE or capability information of the UE, and such information is generally used for mobility management of the UE. The S-GW is a gateway having an E-UTRAN as an end point. The P-GW is a gateway having a PDN as an end point.

Layers of a radio interface protocol between the UE and the network can be classified into a first layer (L1), a second layer (L2), and a third layer (L3) based on the lower three layers of the open system interconnection (OSI) model that is well-known in the communication system. Among them, a physical (PHY) layer belonging to the first layer provides an information transfer service by using a physical channel, and a radio resource control (RRC) layer belonging to the third layer serves to control a radio resource between the UE and the network. For this, the RRC layer exchanges an RRC message between the UE and the BS.

Figure 2:
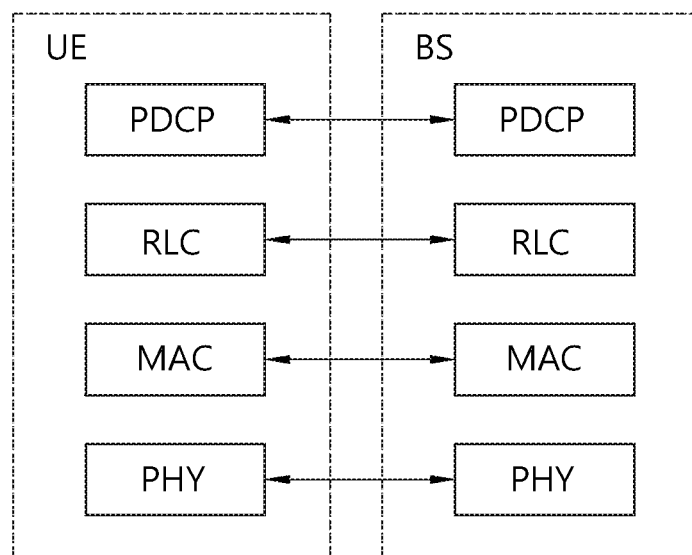
FIG. 2 is a diagram showing a wireless protocol architecture for a user plane.
Figure 3:
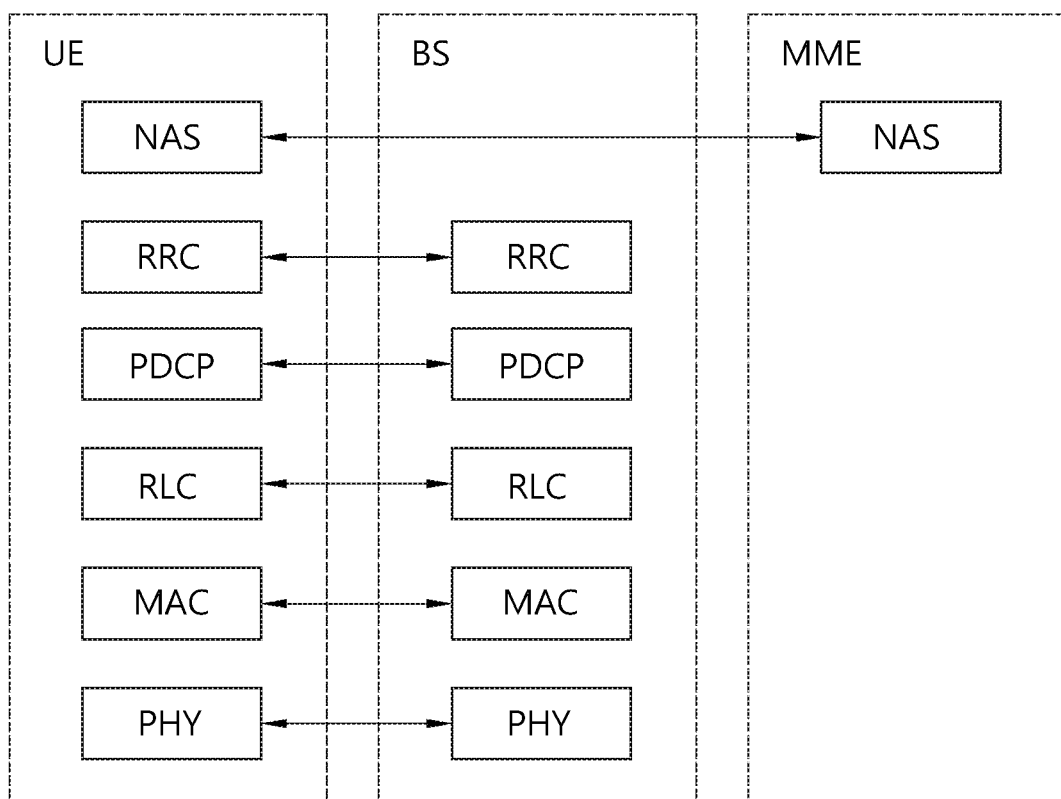
FIG. 3 is a diagram showing a wireless protocol architecture for a control plane.

FIG. 2 is a diagram showing a wireless protocol architecture for a user plane. FIG. 3 is a diagram showing a wireless protocol architecture for a control plane. The user plane is a protocol stack for user data transmission. The control plane is a protocol stack for control signal transmission.

Referring to FIGS. 2 and 3, a PHY layer provides an upper layer with an information transfer service through a physical channel. The PHY layer is connected to a medium access control (MAC) layer which is an upper layer of the PHY layer through a transport channel. Data is transferred between the MAC layer and the PHY layer through the transport channel. The transport channel is classified according to how and with what characteristics data is transferred through a radio interface.

Data is moved between different PHY layers, that is, the PHY layers of a transmitter and a receiver, through a physical channel. The physical channel may be modulated according to an Orthogonal Frequency Division Multiplexing (OFDM) scheme, and use the time and frequency as radio resources.

The functions of the MAC layer include mapping between a logical channel and a transport channel and multiplexing and demultiplexing to a transport block that is provided through a physical channel on the transport channel of a MAC Service Data Unit (SDU) that belongs to a logical channel. The MAC layer provides service to a Radio Link Control (RLC) layer through the logical channel.

The functions of the RLC layer include the concatenation, segmentation, and reassembly of an RLC SDU. In order to guarantee various types of Quality of Service (QoS) required by a Radio Bearer (RB), the RLC layer provides three types of operation mode: Transparent Mode (TM), Unacknowledged Mode (UM), and Acknowledged Mode (AM). AM RLC provides error correction through an Automatic Repeat Request (ARQ).

The RRC layer is defined only on the control plane. The RRC layer is related to the configuration, reconfiguration, and release of radio bearers, and is responsible for control of logical channels, transport channels, and PHY channels. An RB means a logical route that is provided by the first layer (PHY layer) and the second layers (MAC layer, the RLC layer, and the PDCP layer) in order to transfer data between UE and a network.

The function of a Packet Data Convergence Protocol (PDCP) layer on the user plane includes the transfer of user data and header compression and ciphering. The function of the PDCP layer on the user plane further includes the transfer and encryption/integrity protection of control plane data.

What an RB is configured means a procedure of defining the characteristics of a wireless protocol layer and channels in order to provide specific service and configuring each detailed parameter and operating method. An RB can be divided into two types of a Signaling RB (SRB) and a Data RB (DRB). The SRB is used as a passage through which an RRC message is transmitted on the control plane, and the DRB is used as a passage through which user data is transmitted on the user plane.

If RRC connection is established between the RRC layer of UE and the RRC layer of an E-UTRAN, the UE is in the RRC connected state. If not, the UE is in the RRC idle state.

A downlink transport channel through which data is transmitted from a network to UE includes a broadcast channel (BCH) through which system information is transmitted and a downlink shared channel (SCH) through which user traffic or control messages are transmitted. Traffic or a control message for downlink multicast or broadcast service may be transmitted through the downlink SCH, or may be transmitted through an additional downlink multicast channel (MCH). Meanwhile, an uplink transport channel through which data is transmitted from UE to a network includes a random access channel (RACH) through which an initial control message is transmitted and an uplink shared channel (SCH) through which user traffic or control messages are transmitted.

Logical channels that are placed over the transport channel and that are mapped to the transport channel include a broadcast control channel (BCCH), a paging control channel (PCCH), a common control channel (CCCH), a multicast control channel (MCCH), and a multicast traffic channel (MTCH).

The physical channel includes several OFDM symbols in the time domain and several subcarriers in the frequency domain. One subframe includes a plurality of OFDM symbols in the time domain. An RB is a resources allocation unit, and includes a plurality of OFDM symbols and a plurality of subcarriers. Furthermore, each subframe may use specific subcarriers of specific OFDM symbols (e.g., the first OFDM symbol) of the corresponding subframe for a physical downlink control channel (PDCCH), that is, an L1/L2 control channel. A Transmission Time Interval (TTI) is a unit time for subframe transmission.

The RRC state of UE and an RRC connection method are described below.

The RRC state means whether or not the RRC layer of UE is logically connected to the RRC layer of the E-UTRAN. A case where the RRC layer of UE is logically connected to the RRC layer of the E-UTRAN is referred to as an RRC connected state. A case where the RRC layer of UE is not logically connected to the RRC layer of the E-UTRAN is referred to as an RRC idle state. The E-UTRAN may check the existence of corresponding UE in the RRC connected state in each cell because the UE has RRC connection, so the UE may be effectively controlled. In contrast, the E-UTRAN is unable to check UE in the RRC idle state, and a Core Network (CN) manages UE in the RRC idle state in each tracking area, that is, the unit of an area greater than a cell. That is, the existence or non-existence of UE in the RRC idle state is checked only for each large area. Accordingly, the UE needs to shift to the RRC connected state in order to be provided with common mobile communication service, such as voice or data.

When a user first powers UE, the UE first searches for a proper cell and remains in the RRC idle state in the corresponding cell. The UE in the RRC idle state establishes RRC connection with an E-UTRAN through an RRC connection procedure when it is necessary to set up the RRC connection, and shifts to the RRC connected state. A case where UE in the RRC idle state needs to set up RRC connection includes several cases. For example, the cases may include a need to send uplink data for a reason, such as a call attempt by a user, and to send a response message as a response to a paging message received from an E-UTRAN.

A Non-Access Stratum (NAS) layer placed over the RRC layer performs functions, such as session management and mobility management.

In the NAS layer, in order to manage the mobility of UE, two types of states: EPS Mobility Management-REGISTERED (EMM-REGISTERED) and EMM-DEREGISTERED are defined. The two states are applied to UE and the MME. UE is initially in the EMM-DEREGISTERED state. In order to access a network, the UE performs a procedure of registering it with the corresponding network through an initial attach procedure. If the attach procedure is successfully performed, the UE and the MME become the EMM-REGISTERED state.

In order to manage signaling connection between UE and the EPC, two types of states: an EPS Connection Management (ECM)-IDLE state and an ECM-CONNECTED state are defined. The two states are applied to UE and the MME. When the UE in the ECM-IDLE state establishes RRC connection with the E-UTRAN, the UE becomes the ECM- CONNECTED state. The MME in the ECM-IDLE state becomes the ECM-CONNECTED state when it establishes S1 connection with the E-UTRAN. When the UE is in the ECM-IDLE state, the E-UTRAN does not have information about the context of the UE. Accordingly, the UE in the ECM-IDLE state performs procedures related to UE-based mobility, such as cell selection or cell reselection, without a need to receive a command from a network. In contrast, when the UE is in the ECM-CONNECTED state, the mobility of the UE is managed in response to a command from a network. If the location of the UE in the ECM-IDLE state is different from a location known to the network, the UE informs the network of its corresponding location through a tracking area update procedure.

System information is described below.

System information includes essential information that needs to be known by UE in order for the UE to access a BS. Accordingly, the UE needs to have received all pieces of system information before accessing the BS, and needs to always have the up-to-date system information. Furthermore, the BS periodically transmits the system information because the system information is information that needs to be known by all UEs within one cell. The system information is divided into a Master Information Block (MIB) and a plurality of System Information Blocks (SIBs).

The MIB may include a limited number of parameters that are most essential and most frequently transmitted when other information is required to be obtained from a cell. UE first searches for an MIB after downlink synchronization. The MIB may include information, such as an SFN that supports downlink channel bandwidth, a PHICH configuration, and synchronization and operates as a timing criterion and an eNB transmit antenna configuration. The MIB may be transmitted on a broadcast channel (BCH) through broadcasting.

SystemInformationBlockType1 (SIB1) of included SIBs is included in a "SystemInformationBlockType1" message and transmitted. The remaining SIBs other than the SIB1 is included in a system information message and transmitted. To map the SIBs to the system information message may be flexibly configured by a scheduling information list parameter included in the SIB1. In this case, each of the SIBs is included in a single system information message, and only SIBs having the same scheduling requirement value (e.g. cycle) may be mapped to the same system information message. Furthermore, a SystemInformationBlockType2 (SIB2) is always mapped to a system information message corresponding to the first entry within the system information message list of a scheduling information list. A plurality of system information messages may be transmitted within the same cycle. The SIB1 and all the system information messages are transmitted on a DL-SCH.

In addition to broadcast transmission, in an E-UTRAN, the SIB1 may be dedicated-signaled in the state in which it includes a parameter configured like an existing configured value. In this case, the SIB1 may be included in an RRC connection reconfiguration message and transmitted.

The SIB1 includes information related to UE cell access, and defines the scheduling of other SIBs. The SIB1 may include information related to the PLMN identifiers of a network, tracking area code (TAC) and a cell ID, a cell barring status indicative of whether a cell is a cell on which camp-on is possible, the lowest reception level required within a cell which is used as cell reselection criterion, and the transmission time and cycle of other SIBs.

The SIB2 may include radio resource configuration information common to all pieces of UE. The SIB2 may include information related to an uplink carrier frequency and uplink channel bandwidth, an RACH configuration, a page configuration, an uplink power control configuration, a sounding reference signal configuration, a PUCCH configuration supporting ACK/NACK transmission, and a PUSCH configuration.

UE may apply a procedure for obtaining system information and detecting a change of system information to a primary cell (PCell) only. In a secondary cell (SCell), when a corresponding SCell is added, an E-UTRAN may provide all of pieces of system information related to an RRC connection state operation through dedicated signaling. When system information related to a configured SCell is changed, an E-UTRAN may release an SCell that is taken into consideration and subsequently add the changed system information. This may be performed along with a single RRC connection reconfiguration message. An E-UTRAN may configure parameter values different from a value broadcasted within an SCell that has been taken into consideration through dedicated signaling.

UE needs to guarantee the validity of a specific type of system information, and such system information is called required system information. The required system information may be defined as follows.

If UE is an RRC idle state: The UE needs to be guaranteed so that it has the valid versions of the MIB and the SIB1 in addition to the SIB2 to SIB8. This may comply with the support of a radio access technology (RAT) that is taken into consideration.

If UE is an RRC connection state: The UE needs to be guaranteed so that it has the valid versions of the MIB, the SIB1, and the SIB2.

In general, the validity of system information may be guaranteed up to a maximum of 3 hours after the system information is obtained.

In general, service that is provided to UE by a network may be classified into three types as follows. Furthermore, the UE differently recognizes the type of cell depending on what service may be provided to the UE. In the following description, a service type is first described, and the type of cell is described.

1) Limited service: this service provides emergency calls and an Earthquake and Tsunami Warning System (ETWS), and may be provided by an acceptable cell.

2) Suitable service: this service means public service for common uses, and may be provided by a suitable cell (or a normal cell).

3) Operator service: this service means service for communication network operators. This cell may be used by only communication network operators, but may not be used by common users.

In relation to a service type provided by a cell, the type of cell may be classified as follows.

1) An acceptable cell: this cell is a cell from which UE may be provided with limited service. This cell is a cell that has not been barred from a viewpoint of corresponding UE and that satisfies the cell selection criterion of the UE.

2) A suitable cell: this cell is a cell from which UE may be provided with suitable service. This cell satisfies the conditions of an acceptable cell and also satisfies additional conditions. The additional conditions include that the suitable cell needs to belong to a Public Land Mobile Network (PLMN) to which corresponding UE may access and that the suitable cell is a cell on which the execution of a tracking area update procedure by the UE is not barred. If a corresponding cell is a CSG cell, the cell needs to be a cell to which UE may access as a member of the CSG.

3) A barred cell: this cell is a cell that broadcasts information indicative of a barred cell through system information.

4) A reserved cell: this cell is a cell that broadcasts information indicative of a reserved cell through system information.

Figure 4:
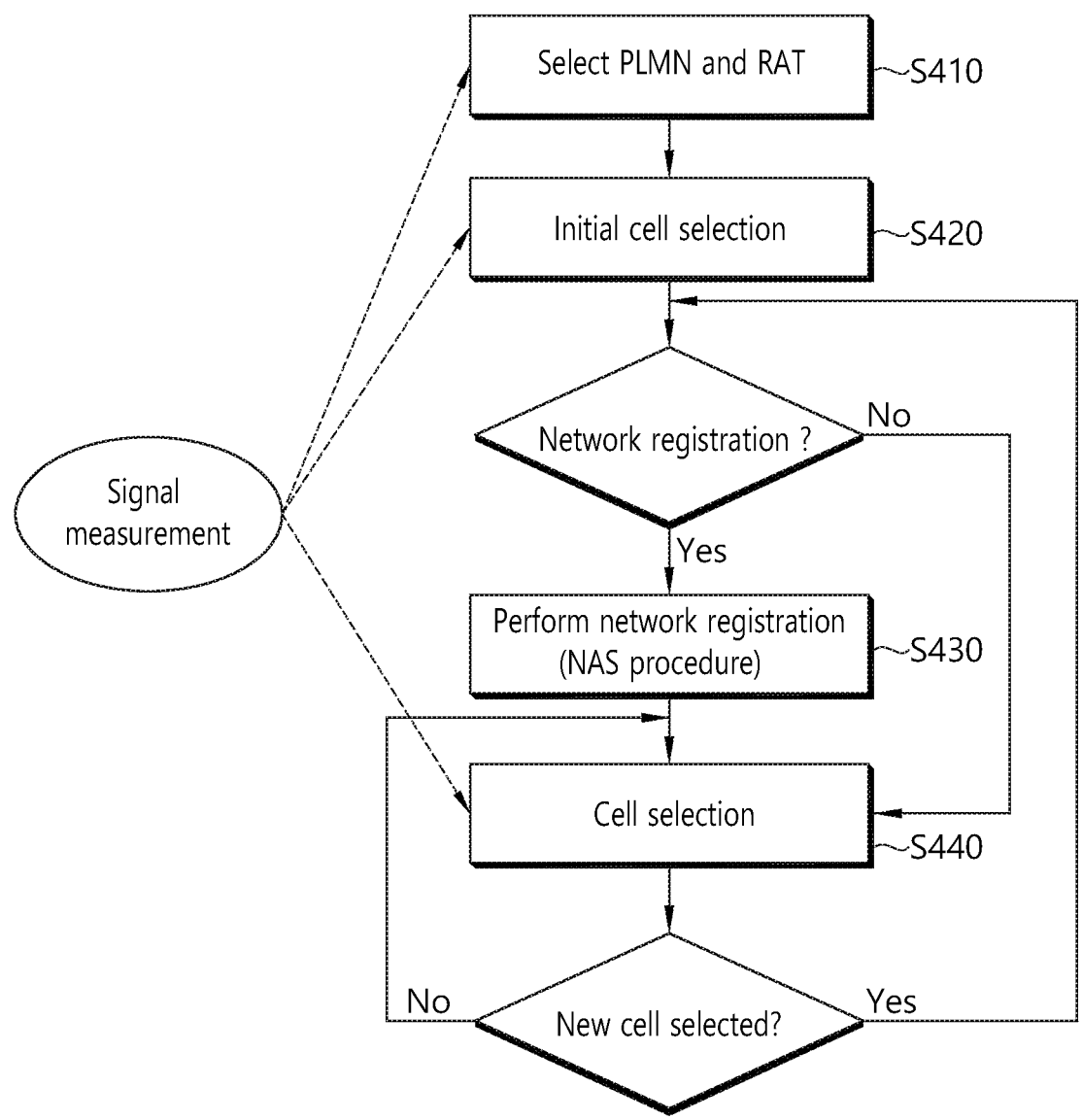
FIG. 4 is a flowchart illustrating the operation of UE in the RRC idle state.

FIG. 4 is a flowchart illustrating the operation of UE in the RRC idle state. FIG. 4 illustrates a procedure in which UE that is initially powered on experiences a cell selection procedure, registers it with a network, and then performs cell reselection if necessary.

Referring to FIG. 4, the UE selects Radio Access Technology (RAT) in which the UE communicates with a Public Land Mobile Network (PLMN), that is, a network from which the UE is provided with service (S410). Information about the PLMN and the RAT may be selected by the user of the UE, and the information stored in a Universal Subscriber Identity Module (USIM) may be used.

The UE selects a cell that has the greatest value and that belongs to cells having measured BS and signal intensity or quality greater than a specific value (cell selection) (S420). In this case, the UE that is powered off performs cell selection, which may be called initial cell selection. A cell selection procedure is described later in detail. After the cell selection, the UE receives system information periodically by the BS. The specific value refers to a value that is defined in a system in order for the quality of a physical signal in data transmission/reception to be guaranteed. Accordingly, the specific value may differ depending on applied RAT.

If network registration is necessary, the UE performs a network registration procedure (S430). The UE registers its information (e.g., an IMSI) with the network in order to receive service (e.g., paging) from the network. The UE does not register it with a network whenever it selects a cell, but registers it with a network when information about the network (e.g., a Tracking Area Identity (TAI)) included in system information is different from information about the network that is known to the UE.

The UE performs cell reselection based on a service environment provided by the cell or the environment of the UE (S440). If the value of the intensity or quality of a signal measured based on a BS from which the UE is provided with service is lower than that measured based on a BS of a neighboring cell, the UE selects a cell that belongs to other cells and that provides better signal characteristics than the cell of the BS that is accessed by the UE. This procedure is called cell reselection differently from the initial cell selection of the No. 2 procedure. In this case, temporal restriction conditions are placed in order for a cell to be frequently reselected in response to a change of signal characteristic. A cell reselection procedure is described later in detail.

Figure 5:
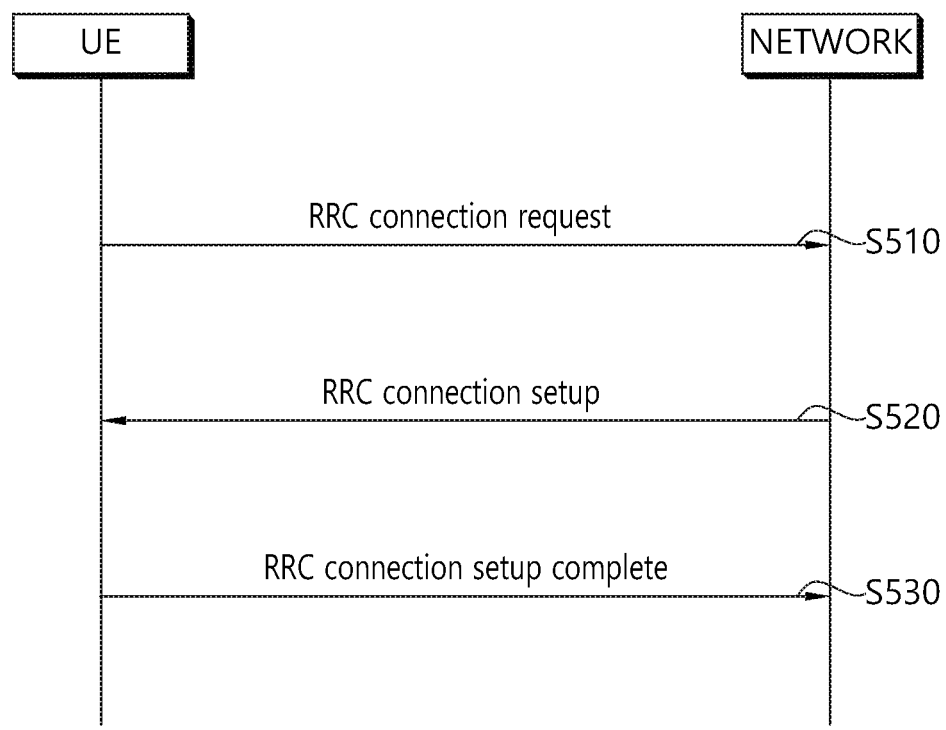
FIG. 5 is a flowchart illustrating a procedure of establishing RRC connection.

FIG. 5 is a flowchart illustrating a procedure of establishing RRC connection.

UE sends an RRC connection request message that requests RRC connection to a network (S510). The network sends an RRC connection establishment message as a response to the RRC connection request (S520). After receiving the RRC connection establishment message, the UE enters RRC connected mode.

The UE sends an RRC connection establishment complete message used to check the successful completion of the RRC connection to the network (S530).

Figure 6:
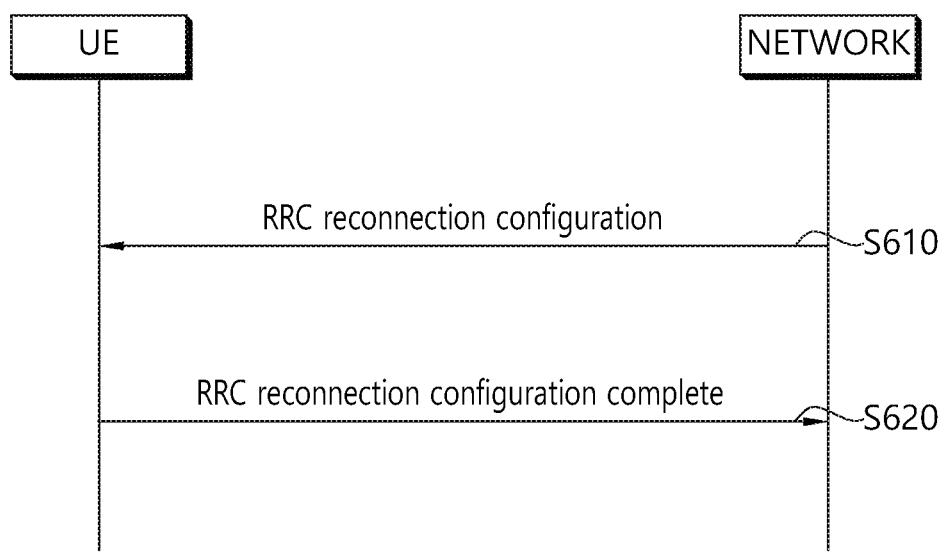
FIG. 6 is a flowchart illustrating an RRC connection reconfiguration procedure.

FIG. 6 is a flowchart illustrating an RRC connection reconfiguration procedure. An RRC connection reconfiguration is used to modify RRC connection. This is used to establish/modify/release RBs, perform handover, and set up/modify/release measurements.

A network sends an RRC connection reconfiguration message for modifying RRC connection to UE (S610). As a response to the RRC connection reconfiguration message, the UE sends an RRC connection reconfiguration complete message used to check the successful completion of the RRC connection reconfiguration to the network (S620).

Hereinafter, a public land mobile network (PLMN) is described.

The PLMN is a network which is disposed and operated by a mobile network operator. Each mobile network operator operates one or more PLMNs. Each PLMN may be identified by a Mobile Country Code (MCC) and a Mobile Network Code (MNC). PLMN information of a cell is included in system information and broadcasted.

In PLMN selection, cell selection, and cell reselection, various types of PLMNs may be considered by the terminal.

Home PLMN (HPLMN): PLMN having MCC and MNC matching with MCC and MNC of a terminal IMSI.

Equivalent HPLMN (EHPLMN): PLMN serving as an equivalent of an HPLMN.

Registered PLMN (RPLMN): PLMN successfully finishing location registration.

Equivalent PLMN (EPLMN): PLMN serving as an equivalent of an RPLMN.

Each mobile service consumer subscribes in the HPLMN. When a general service is provided to the terminal through the HPLMN or the EHPLMN, the terminal is not in a roaming state. Meanwhile, when the service is provided to the terminal through a PLMN except for the HPLMN/EHPLMN, the terminal is in the roaming state. In this case, the PLMN refers to a Visited PLMN (VPLMN).

When UE is initially powered on, the UE searches for available Public Land Mobile Networks (PLMNs) and selects a proper PLMN from which the UE is able to be provided with service. The PLMN is a network that is deployed or operated by a mobile network operator. Each mobile network operator operates one or more PLMNs. Each PLMN may be identified by Mobile Country Code (MCC) and Mobile Network Code (MNC). Information about the PLMN of a cell is included in system information and broadcasted. The UE attempts to register it with the selected PLMN. If registration is successful, the selected PLMN becomes a Registered PLMN (RPLMN). The network may signalize a PLMN list to the UE. In this case, PLMNs included in the PLMN list may be considered to be PLMNs, such as RPLMNs. The UE registered with the network needs to be able to be always reachable by the network. If the UE is in the ECM-CONNECTED state (identically the RRC connection state), the network recognizes that the UE is being provided with service. If the UE is in the ECM-IDLE state (identically the RRC idle state), however, the situation of the UE is not valid in an eNB, but is stored in the MME. In such a case, only the MME is informed of the location of the UE in the ECM-IDLE state through the granularity of the list of Tracking Areas (TAs). A single TA is identified by a Tracking Area Identity (TAI) formed of the identifier of a PLMN to which the TA belongs and Tracking Area Code (TAC) that uniquely expresses the TA within the PLMN.

Thereafter, the UE selects a cell that belongs to cells provided by the selected PLMN and that has signal quality and characteristics on which the UE is able to be provided with proper service.

The following is a detailed description of a procedure of selecting a cell by a terminal.

When power is turned-on or the terminal is located in a cell, the terminal performs procedures for receiving a service by selecting/reselecting a suitable quality cell.

A terminal in an RRC idle state should prepare to receive a service through the cell by always selecting a suitable quality cell. For example, a terminal where power is turned-on just before should select the suitable quality cell to be registered in a network. If the terminal in an RRC connection state enters in an RRC idle state, the terminal should selects a cell for stay in the RRC idle state. In this way, a procedure of selecting a cell satisfying a certain condition by the terminal in order to be in a service idle state such as the RRC idle state refers to cell selection. Since the cell selection is performed in a state that a cell in the RRC idle state is not currently determined, it is important to select the cell as rapid as possible. Accordingly, if the cell provides a wireless signal quality of a predetermined level or greater, although the cell does not provide the best wireless signal quality, the cell may be selected during a cell selection procedure of the terminal.

A method and a procedure of selecting a cell by a terminal in a 3GPP LTE is described with reference to 3GPP TS 36.304 V8.5.0 (2009 March) "User Equipment (UE) procedures in idle mode (Release 8)".

A cell selection procedure is basically divided into two types.

The first is an initial cell selection procedure. In this procedure, UE does not have preliminary information about a wireless channel. Accordingly, the UE searches for all wireless channels in order to find out a proper cell. The UE searches for the strongest cell in each channel. Thereafter, if the UE has only to search for a suitable cell that satisfies a cell selection criterion, the UE selects the corresponding cell.

Next, the UE may select the cell using stored information or using information broadcasted by the cell. Accordingly, cell selection may be fast compared to an initial cell selection procedure. If the UE has only to search for a cell that satisfies the cell selection criterion, the UE selects the corresponding cell. If a suitable cell that satisfies the cell selection criterion is not retrieved though such a procedure, the UE performs an initial cell selection procedure.

A cell selection criterion may be defined as in Equation 1 below. Following Equation 1 can be referred to as measurement for determining whether or not S-criterion is satisfied.

Srxlev>0 AND Squal>0, where:

Srxlev=$Q_{rxlevmeas}-(Q_{rxlevmin}+Q_{rxlevminoffset})-P_{compensation}$,

Squal=$Q_{qualmeas}-(Q_{qualmin}+Q_{qualminoffset})$

In this case, in Equation 1, the variables may be defined as in Table 1 below.

TABLE 1

| | |
|---|---|
| Srxlev | Cell selection RX level value (dB) |
| Squal | Cell selection quality value (dB) |
| $Q_{rxlevmeas}$ | Measured cell RX level value (RSRP) |
| $Q_{qualmeas}$ | Measured cell quality value (RSRQ) |
| $Q_{rxlevmin}$ | Minimum required RX level in the cell (dBm) |
| $Q_{qualmin}$ | Minimum required quality level in the cell (dB) |
| $Q_{rxlevminoffset}$ | Offset to the signalled $Q_{rxlevmin}$ taken into account in the Srxlev evaluation as a result of a periodic search for a higher priority PLMN while camped normally in a VPLMN |

TABLE 1-continued

| | |
|---|---|
| $Q_{qualminoffset}$ | Offset to the signalled $Q_{qualmin}$ taken into account in the Squal evaluation as a result of a periodic search for a higher priority PLMN while camped normally in a VPLMN |
| Pcompensation | max($P_{EMAX} - P_{PowerClass}$, 0) (dB) |
| $P_{EMAX}$ | Maximum TX power level an UE may use when transmitting on the uplink in the cell (dBm) defined as $P_{EMAX}$ in [TS 36.101] |
| $P_{PowerClass}$ | Maximum RF output power of the UE (dBm) according to the UE power class as defined in [TS 36.101] |

Qrxlevminoffset and Qqualminoffset, that is, signaled values, are the results of periodic discovery for a PLMN having higher priority while UE camps on a normal cell within a VPLMN, and may be applied only when cell selection is evaluated. As described above, during the periodic discovery of a PLMN having higher priority, UE may perform cell selection evaluation using parameter values stored from another cell of the PLMN having such higher priority.

After UE selects any cell through a cell selection procedure, the intensity or quality of a signal between the UE and a BS may be changed due to the mobility of the UE or a change of a radio environment. Accordingly, if the quality of the selected cell is changed, the UE may select another cell providing better quality.

After the UE selects a specific cell through the cell selection procedure, the intensity or quality of a signal between the UE and a BS may be changed due to a change in the mobility or wireless environment of the UE. Accordingly, if the quality of the selected cell is deteriorated, the UE may select another cell that provides better quality. If a cell is reselected as described above, the UE selects a cell that provides better signal quality than the currently selected cell. Such a procedure is called cell reselection. In general, a basic object of the cell reselection procedure is to select a cell that provides UE with the best quality from a viewpoint of the quality of a radio signal.

In addition to the viewpoint of the quality of a radio signal, a network may determine priority corresponding to each frequency, and may inform the UE of the determined priorities. The UE that has received the priorities preferentially takes into consideration the priorities in a cell reselection procedure compared to a radio signal quality criterion.

As described above, there is a method of selecting or reselecting a cell according to the signal characteristics of a wireless environment. In selecting a cell for reselection when a cell is reselected, the following cell reselection methods may be present according to the RAT and frequency characteristics of the cell.

Intra-frequency cell reselection: UE reselects a cell having the same center frequency as that of RAT, such as a cell on which the UE camps on.

Inter-frequency cell reselection: UE reselects a cell having a different center frequency from that of RAT, such as a cell on which the UE camps on Inter-RAT cell reselection: UE reselects a cell that uses RAT different from RAT on which the UE camps The principle of a cell reselection procedure is as follows.

First, UE measures the quality of a serving cell and neighbor cells for cell reselection.

Second, cell reselection is performed based on a cell reselection criterion. The cell reselection criterion has the following characteristics in relation to the measurements of a serving cell and neighbor cells.

Intra-frequency cell reselection is basically based on ranking. Ranking is a task for defining a criterion value for evaluating cell reselection and numbering cells using criterion values according to the size of the criterion values. A cell having the best criterion is commonly called the best-ranked cell. The cell criterion value is based on the value of a corresponding cell measured by UE, and may be a value to which a frequency offset or cell offset has been applied, if necessary.

Inter-frequency cell reselection is based on frequency priority provided by a network. UE attempts to camp on a frequency having the highest frequency priority. A network may provide frequency priority that will be applied by UEs within a cell in common through broadcasting signaling, or may provide frequency-specific priority to each UE through UE-dedicated signaling. A cell reselection priority provided through broadcast signaling may refer to a common priority. A cell reselection priority for each terminal set by a network may refer to a dedicated priority. If receiving the dedicated priority, the terminal may receive a valid time associated with the dedicated priority together. If receiving the dedicated priority, the terminal starts a validity timer set as the received valid time together therewith. While the valid timer is operated, the terminal applies the dedicated priority in the RRC idle mode. If the valid timer is expired, the terminal discards the dedicated priority and again applies the common priority.

For the inter-frequency cell reselection, a network may provide UE with a parameter (e.g., a frequency-specific offset) used in cell reselection for each frequency. For the intra-frequency cell reselection or the inter-frequency cell reselection, a network may provide UE with a Neighboring Cell List (NCL) used in cell reselection. The NCL includes a cell-specific parameter (e.g., a cell-specific offset) used in cell reselection. For the intra-frequency or inter-frequency cell reselection, a network may provide UE with a cell reselection black list used in cell reselection.

The UE does not perform cell reselection on a cell included in the black list.

Ranking performed in a cell reselection evaluation procedure is described below.

A ranking criterion used to give the priority of a cell is defined as in Equation 2.

$$R_s = Q_{meas,s} + Q_{hyst}, R_n Q_{meas,n} - Q_{offset} \quad \text{[Equation 2]}$$

In Equation 2, Rs is the ranking criterion of a serving cell on which UE now camps, Rn is the ranking criterion of a neighboring cell, Qmeas,s is the quality value of the serving cell measured by the UE, Qmeas,n is the quality value of the neighboring cell measured by the UE, Qhyst is a hysteresis value for ranking, and Qoffset is an offset between the two cells.

In Intra-frequency, if UE receives an offset "Qoffsets,n" between a serving cell and a neighbor cell, Qoffset=Qoffsets,n. If UE does not Qoffsets,n, Qoffset=0.

In Inter-frequency, if UE receives an offset "Qoffsets,n" for a corresponding cell, Qoffset=Qoffsets,n+Qfrequency. If UE does not receive "Qoffsets,n", Qoffset=Qfrequency.

If the ranking criterion Rs of a serving cell and the ranking criterion Rn of a neighbor cell are changed in a similar state, ranking priority is frequency changed as a result of the change, and UE may alternately reselect the twos. Qhyst is a parameter that gives hysteresis to cell reselection so that UE is prevented from to alternately reselecting two cells.

UE measures RS of a serving cell and Rn of a neighbor cell according to the above equation, considers a cell having the greatest ranking criterion value to be the best-ranked cell, and reselects the cell.

In accordance with the criterion, it may be checked that the quality of a cell is the most important criterion in cell reselection. If a reselected cell is not a suitable cell, UE excludes a corresponding frequency or a corresponding cell from the subject of cell reselection.

Hereinafter, radio link failure (RLF) will be described.

UE continues to perform measurements in order to maintain the quality of a radio link with a serving cell from which the UE receives service. The UE determines whether or not communication is impossible in a current situation due to the deterioration of the quality of the radio link with the serving cell. If communication is almost impossible because the quality of the serving cell is too low, the UE determines the current situation to be an RLF.

If the RLF is determined, the UE abandons maintaining communication with the current serving cell, selects a new cell through cell selection (or cell reselection) procedure, and attempts RRC connection re-establishment with the new cell.

In the specification of 3GPP LTE, the following examples are taken as cases where normal communication is impossible.

A case where UE determines that there is a serious problem in the quality of a downlink communication link (a case where the quality of a PCell is determined to be low while performing RLM) based on the radio quality measured results of the PHY layer of the UE A case where uplink transmission is problematic because a random access procedure continues to fail in the MAC sublayer.

A case where uplink transmission is problematic because uplink data transmission continues to fail in the RLC sublayer.

A case where handover is determined to have failed.

A case where a message received by UE does not pass through an integrity check.

An RRC connection re-establishment procedure is described in more detail below.

Figure 7:
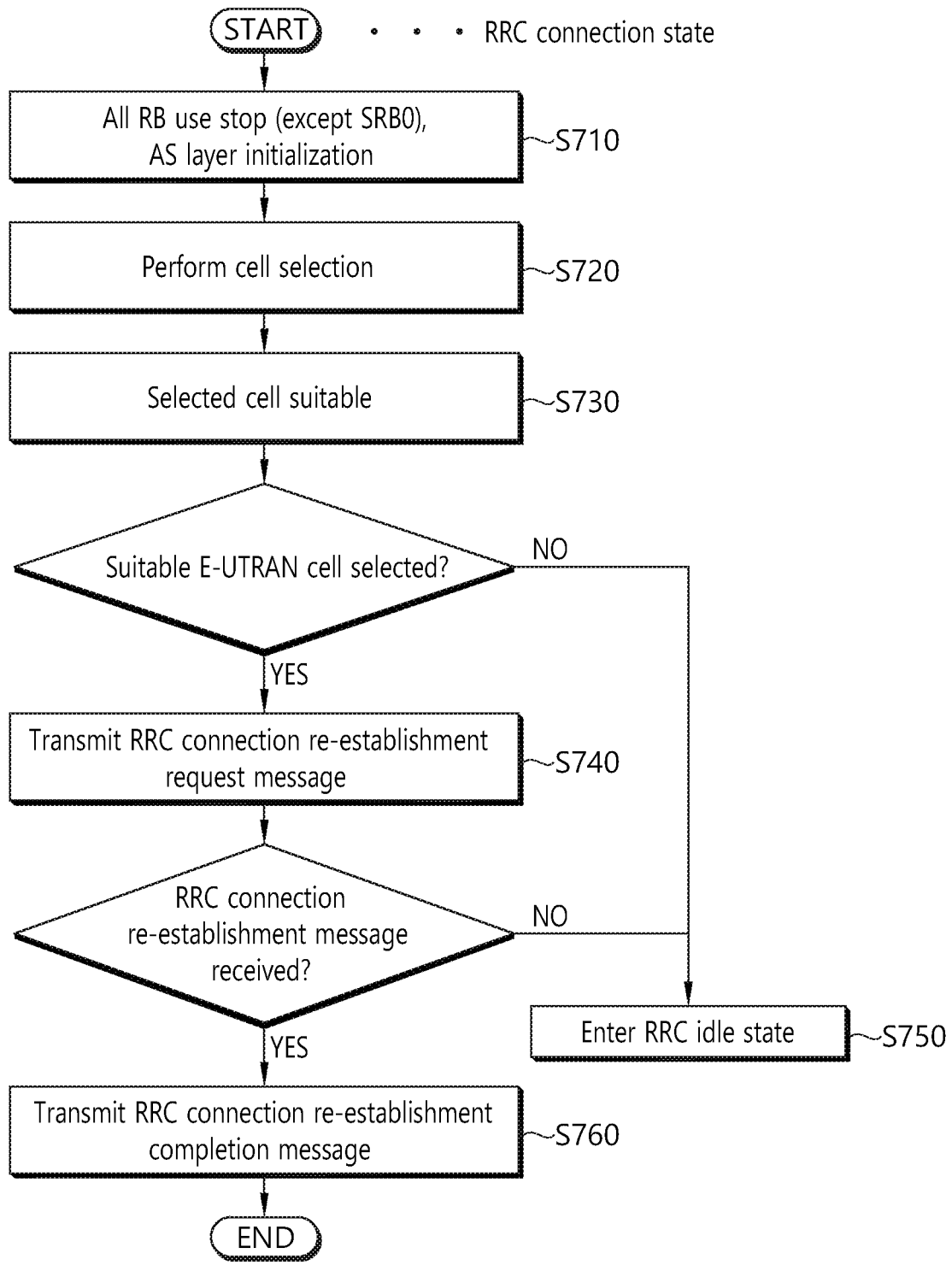
FIG. 7 is a diagram illustrating an RRC connection re-establishment procedure.

FIG. 7 is a diagram illustrating an RRC connection re-establishment procedure.

Referring to FIG. 7, UE stops using all the radio bearers that have been configured other than a Signaling Radio Bearer (SRB) #0, and initializes a variety of kinds of sublayers of an Access Stratum (AS) (S710). Furthermore, the UE configures each sublayer and the PHY layer as a default configuration. In this procedure, the UE maintains the RRC connection state.

The UE performs a cell selection procedure for performing an RRC connection reconfiguration procedure (S720). The cell selection procedure of the RRC connection re-establishment procedure may be performed in the same manner as the cell selection procedure that is performed by the UE in the RRC idle state, although the UE maintains the RRC connection state.

After performing the cell selection procedure, the UE determines whether or not a corresponding cell is a suitable cell by checking the system information of the corresponding cell (S730). If the selected cell is determined to be a suitable E-UTRAN cell, the UE sends an RRC connection re-establishment request message to the corresponding cell (S740).

Meanwhile, if the selected cell is determined to be a cell that uses RAT different from that of the E-UTRAN through the cell selection procedure for performing the RRC connection re-establishment procedure, the UE stops the RRC connection re-establishment procedure and enters the RRC idle state (S750).

If the RRC connection re-establishment procedure is successfully performed, the cell and the UE perform an RRC connection reconfiguration procedure. Accordingly, the UE recovers the state prior to the execution of the RRC connection re-establishment procedure, and the continuity of service is guaranteed to the upmost.

A timer associated with RRC connection re-establishment may be illustrated as listed in table 2.

TABLE 2

| Timer | Start | Stop | At expiry |
|---|---|---|---|
| T301 | Transmission of RRCConnectionReestabilshment Request | Reception of RRCConnectionReestablishment or RRCConnectionReestablishment Reject message as well as when the selected cell becomes unsuitable | Go to RRC_IDLE |
| T304 | Reception of RRCConnectionReconfiguration message including the MobilityControl Info orreception of MobilityFromEUTRAComm and message including CellChangeOrder | Criterion for successful completion of handover within E-UTRA, handover to E-UTRA or cell change order is met (the criterion is specified in the target RAT in case of inter-RAT) | In case of cell change order from E-UTRA or intra E-UTRA handover, initiate the RRC connection re-establishment procedure; In case of handover to E-UTRA, perform the actions defined in the specifications applicable for the source RAT |
| T311 | Upon initiating the RRC connection re-establishment procedure | Selection of a suitable E-UTRA cell or a cell using another RAT | Enter RRC_IDLE |

The UE may be implemented to finish checking whether the selected cell is a suitable cell through the cell selection procedure and the reception of the system information of the selected cell. To this end, the UE may drive a timer when the RRC connection re-establishment procedure is started. The timer may be stopped if it is determined that the UE has selected a suitable cell. If the timer expires, the UE may consider that the RRC connection re-establishment procedure has failed, and may enter the RRC idle state. Such a timer is hereinafter called an RLF timer. In LTE spec TS 36.331, a timer named "T311" may be used as an RLF timer. The UE may obtain the set value of the timer from the system information of the serving cell.

If an RRC connection re-establishment request message is received from the UE and the request is accepted, a cell sends an RRC connection re-establishment message to the UE.

The UE that has received the RRC connection re-establishment message from the cell reconfigures a PDCP sublayer and an RLC sublayer with an SRB1. Furthermore, the UE calculates various key values related to security setting, and reconfigures a PDCP sublayer responsible for security as the newly calculated security key values. Accordingly, the SRB 1 between the UE and the cell is open, and the UE and the cell may exchange RRC control messages. The UE completes the restart of the SRB1, and sends an RRC connection re-establishment complete message indicative of that the RRC connection re-establishment procedure has been completed to the cell (S760).

In contrast, if the RRC connection re-establishment request message is received from the UE and the request is not accepted, the cell sends an RRC connection re-establishment reject message to the UE.

Figure 8:
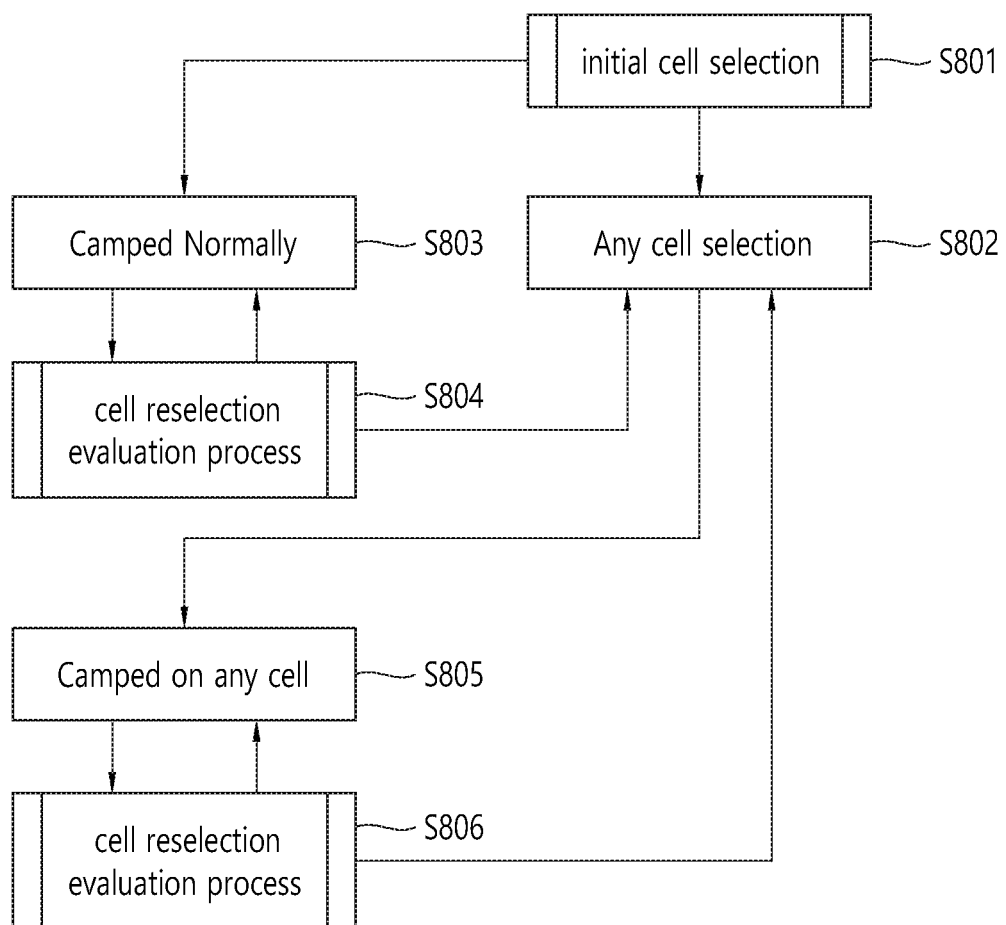
FIG. 8 illustrates sub states where the terminal may have in an RRC_IDLE state and a sub state transition process.

FIG. 8 illustrates sub states where the terminal may have in an RRC_IDLE state and a sub state transition process.

Referring to FIG. 8, a terminal performs an initial cell selection process (S801). The initial cell selection process may be performed when there is no stored cell information with respect to the PLMN or a suitable cell is not found.

If the suitable cell is not found in the initial cell selection process, the terminal transitions to an any cell selection state (S802). The optional cell selection state represents a state which does not camp on in both of a suitable cell and an acceptable cell. The optional cell selection state is a state attempted by the terminal in order to find an acceptable cell of an optional PLMN which may camp on. When the terminal finds no cells which may camp on, the terminal is continuously maintained in an optional cell selection state until the acceptable cell is found.

If the suitable cell is found in the initial cell selection process, the state transits to a normal camp state (S803). The normal camp state represents a state which camps on the normal cell. A paging channel is selected according to information given through system information to motor, and an evaluation process for cell reselection may be performed.

In the normal camp state (S803), if a cell reselection evaluation process (S804) is caused, the cell reselection evaluation process (S804) is performed. If a suitable cell is found in the cell reselection evaluation process (S804), the terminal again transits to the normal camp state (S803).

If an acceptable cell is found in the any cell selection state (S802), the terminal transits to an any cell camped state (S805). The any cell camped state (S805) represents a state of camping on an acceptable cell.

In the any cell camped state (S805), the terminal may select a paging channel according to information given through system information to monitor, and may perform a cell reselection evaluation process (S806). If the acceptable cell is not found in the cell reselection evaluation process (S806), the terminal transits the any cell selection state (S802).

Hereinafter, a D2D operation will be described. In the 3GPP LTE-A, a service related to the D2D operation refers to Proximity based Services (ProSe). Hereinafter, the ProSe is an equivalent concept with the D2D operation and the ProSe may be compatibly used with the D2D operation. The ProSe is now described.

The ProSe includes ProSe direct communication and ProSe direct discovery. The ProSe direct communication presents communication performed by two or more adjacent terminals. The terminals may perform communication using a protocol of a user plane. A ProSe-enabled UE means a UE for supporting a process related to requirements of the ProSe. Unless otherwise defined, the ProSe-enabled UE includes both of a public safety UE and a non-public safety UE. The public safety UE represents a UE for supporting both of a public safety specified function and the ProSe process. The non-public safety UE is a terminal which supports the ProSe process but does not support the public safety specified function.

The ProSe direct discovery is a process where the ProSe-enabled UE discovers another ProSe-enabled UE. In this case, only ability of the two ProSe-enabled UEs is used. An EPC-level ProSe discovery signifies a process where an EPC determines whether 2 ProSe enable terminals are closed to each other, and reports the close state thereof the two ProSe enabled terminals.

Hereinafter, the ProSe direct communication may refer to D2D communication, and the ProSe direct discovery may refer to D2D discovery.

Figure 9:
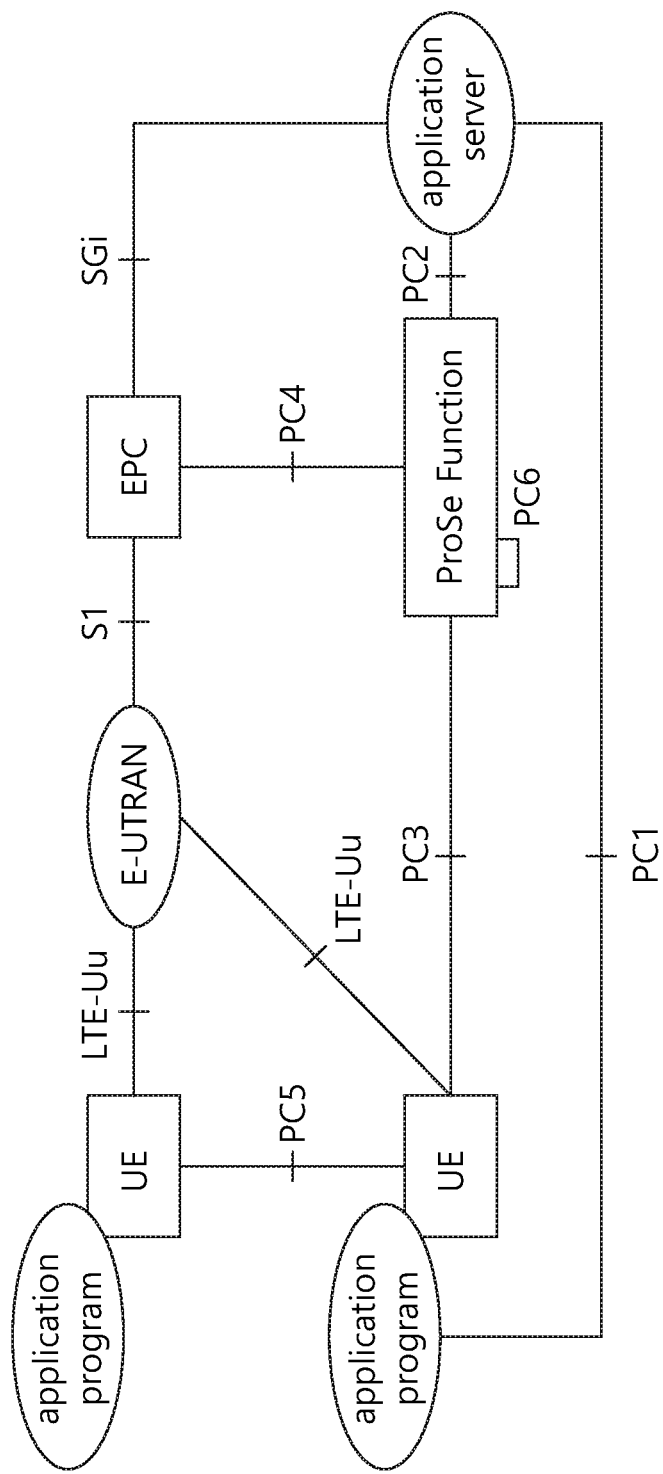
FIG. 9 illustrates a reference structure for a ProSe.

FIG. 9 illustrates a reference structure for a ProSe.

Referring to FIG. 9, the reference structure for a ProSe includes a plurality of terminals having E-UTRAN, EPC, and ProSe application program, a ProSe application (APP) server, and a ProSe function.

An EPC is a representative example of the E-UTRAN. The EPC may include an MME, an S-GW, a P-GW, a policy and charging rules function (PCRF), and a home subscriber server (HSS).

The ProSe application server is a user of ProSe in order to make an application function. The ProSe application server may communicate with an application program in the terminal. The application program in the terminal may use a ProSe ability to make an application function.

The ProSe function may include at least one of following functions but is not limited thereto.
  Interworking via a reference point towards the 3rd party applications
  Authorization and configuration of the UE for discovery and direct communication)
  Enable the function of the EPC level ProSe discovery
  ProSe related new subscriber data and handling of data storage, and also handling of ProSe identities
  Security related function
  Provide control towards the EPC for policy related function
  Provide function for charging (via or outside of EPC, e.g., offline charging))

Hereinafter, a reference point and a reference interface will be described in a reference structure for the ProSe.
  PC1: a reference point between a ProSe application program in the terminal and a ProSe application program in a ProSe application server. The PC1 is used to define signaling requirements in an application level.
  PC2: is a reference point between the ProSe application server and a ProSe function. The PC2 is used to define an interaction between the ProSe application server and a ProSe function. An application data update of a ProSe database of the ProSe function may be an example of the interaction.
  PC3: is a reference point between the terminal and the ProSe function. The PC3 is used to define an interaction between the terminal and the ProSe function. Configuration for ProSe discovery and communication may be an example of the interaction.
  PC4: is a reference point between an EPC and the ProSe function. The PC4 is used to define an interaction between the EPC and the ProSe function. The interaction lay illustrate when a path for 1:1 communication or a ProSe service for real time session management or mobility management are authorized.
  PC5: is a reference point to use control/user plane for discovery, communication, and relay between terminals, and 1:1 communication.
  PC6: is a reference point to use a function such as ProSe discovery between users included in different PLMNs.
  SGi: may be used for application data and application level control information exchange.

<ProSe Direct Communication (D2D Communication)>.

The ProSe direct communication is a communication mode where two public safety terminals may perform direct communication through a PC 5 interface. The communication mode may be supported in both of a case of receiving a service in coverage of E-UTRAN or a case of separating the coverage of E-UTRAN.

Figure 10:
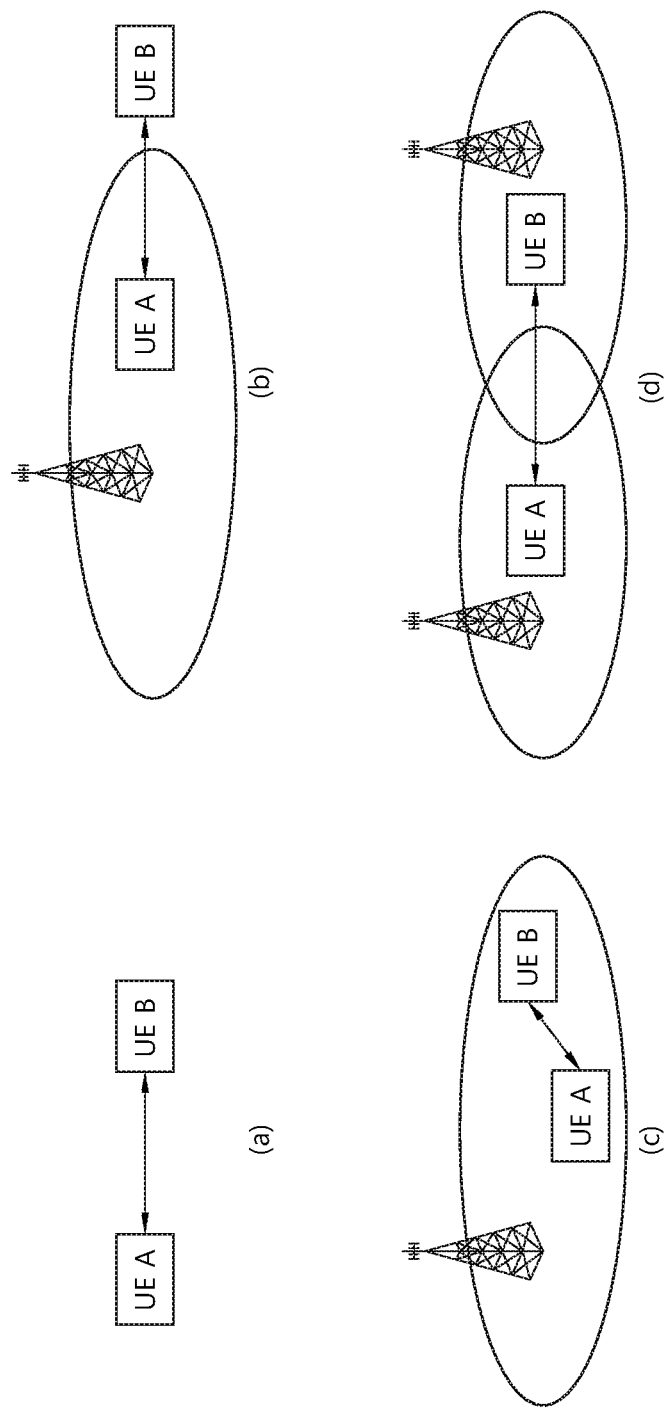
FIG. 10 illustrates arrangement examples of terminals performing ProSe direct communication and cell coverage.

FIG. 10 illustrates arrangement examples of terminals performing ProSe direct communication and cell coverage.

Referring to FIG. 10(a), UEs A and B may be located outside of the cell coverage. Referring to FIG. 10(b), the UE A may be located in the cell coverage and the UE B may be located outside of the cell coverage. Referring to FIG. 10(c), both of UEs A and B may be located in the cell coverage. Referring to FIG. 10(d), the UE A may be located in coverage of a first cell and the UE B may be in coverage of a second cell.

As described above, the ProSe direct communication may be performed between terminals which are provided at various positions.

Meanwhile, following IDs may be used in the ProSe direct communication.

Source layer-2 ID: The source layer-2 ID identifies a sender of a packet in a PC 5 interface.

Purpose layer-2 ID: The purpose layer-2 ID identifies a target of a packet in a PC 5 interface.

SA L1 ID: The SA L1 ID represents an in an ID in a scheduling assignment (SA) in the PC 5 interface.

Figure 11:
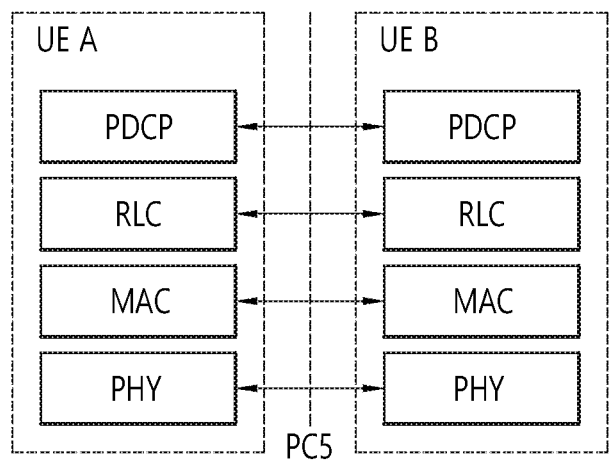
FIG. 11 illustrates a user plane protocol stack for the ProSe direct communication.

FIG. 11 illustrates a user plane protocol stack for the ProSe direct communication.

Referring to FIG. 11, the PC 5 interface includes a PDCH layer, a RLC layer, a MAC layer, and a PHY layer.

There may not be HARQ feedback in the ProSe direct communication. An MAC header may include the source layer-2 ID and the purpose layer-2 ID.

<Radio Resource Assignment for ProSe Direct Communication>.

A ProSe enable terminal may use following two modes with respect to resource assignments for the ProSe direct communication.

1. Mode 1

The mode 2 is a mode for receiving scheduling a resource for the ProSe direct communication from a base station. The terminal should be in a RRC_CONNECTED state according to the mode 1 in order to transmit data. The terminal requests a transmission resource to the base station, and the base station schedules a resource for scheduling assignment and data transmission. The terminal may transmit a scheduling request to the base station and may transmit a Buffer Status Report (ProSe BSR). The base station has data which the terminal will perform the ProSe direct communication and determines whether a resource for transmitting the data is required.

2. Mode 2

The mode 2 is a mode for selecting a direct resource. The terminal directly selects a resource for the ProSe direct communication from a resource pool. The resource pool may be configured by a network or may be previously determined.

Meanwhile, when the terminal includes a serving cell, that is, when the terminal is in an RRC_CONNECTED state with the base station or is located in a specific cell in an RRC_IDLE state, the terminal is regarded to be in coverage of the base station.

If the terminal is located outside of the coverage, only the mode 2 is applicable. If the terminal is located in the coverage, the mode 1 or the mode 2 may be used according to setting of the base station.

If there are no exceptional conditions, only when the base station is configured, the terminal may change a mode from the mode 1 to the mode 2 or from the mode 2 to the mode 1.

<ProSe Direct Discovery (D2D Discovery)>

The ProSe direct discovery represents a process used to discover when the ProSe enabled terminal discovers other neighboring ProSe enabled terminal and refers to D2D direction discovery or D2D discovery. In this case, an E-UTRA wireless signal through the PC 4 interface may be used. Hereinafter, information used for the ProSe direct discovery refers to discovery information.

Figure 12:
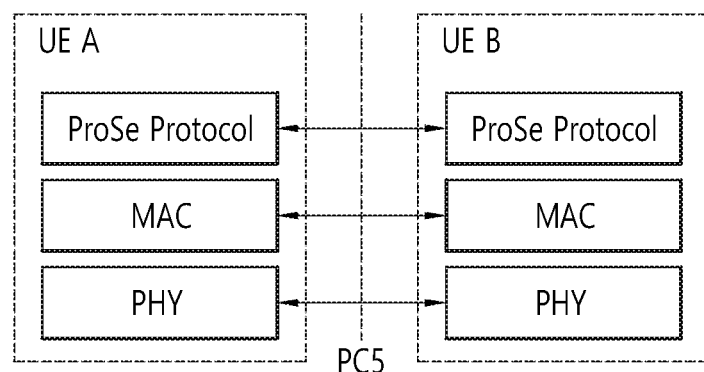
FIG. 12 illustrates a PC 5 interface for D2D discovery.

FIG. 12 illustrates a PC 5 interface for D2D discovery.

Referring to FIG. 12, the PC 5 interface includes an MAC layer, a PHY layer, and a ProSe Protocol layer being an upper layer. Permission for announcement and monitoring of discovery information is handled in the upper layer ProSe Protocol. Contents of discovery information are transparent to an access stratum (AS). The ProSe Protocol allows only valid discovery information to be transferred to the AS for announcement.

An MAC layer receives discovery information from the upper layer ProSe Protocol. An IP layer is not used for transmitting the discovery information. The MAC layer determines a resource used in order to announce the discovery information received from the upper layer. The MAC layer makes and sends a protocol data unit (MAC PDU) to a physical layer. An MAC header is not added.

There are two types of resource assignments for announcing the discovery information.

1. Type 1

The type 1 is a method assigned so that resources for announcing the discovery information are not terminal-specific and the base station provides resource pool configuration for announcing the discovery information to the terminals. The configuration may be included in a system information block (SIB) to be signaled in a broadcast scheme. Alternatively, the configuration may be included in a terminal specific RRC message to be provided. Alternatively, the configuration may be broadcast-signaled or terminal-specific signaled of a different layer from the RRC message.

The terminal selects a resource from an indicated resource pool to announce discovery information using the selected resource. The terminal may announce discovery information through a resource optionally selected during each discovery period.

2. Type 2

The type 2 is a method where resources for announcing the discovery information are terminal-specifically assigned. A terminal in a RRC_CONNECTED state may request a resource for announcing a discovery signal to the base station through a RRC signal. The base station may assign a resource for announcing a discovery signal as an RRC signal. A resource for monitoring the discovery signal in a configured resource pool may be assigned in terminals.

With respect to a terminal in an RRC_IDLE state, a base station may report a type 1 resource pool for announcing the discovery signal as an SIB. Terminals where ProSe direct discovery is allowed use a type 1 resource pool for announcing the discovery information in the RRC_IDLE state. Alternatively, the base station 2) reports that the base station supports the ProSe direct discovery through the SIB but may not provide the resource for announcing the discovery information. In this case, the terminal should enter the RRC_CONNECTED state for announcing the discovery information.

With respect to a terminal in an RRC_CONNECTED state, the base station may configure whether to use a type 1 resource pool or a type 2 resource pool for announcing the discovery information through a RRC signal.

Hereinafter, the present invention is described.

As described above, in general, a D2D operation may have various advantages in signal transmission/reception between adjacent devices. For example, a D2D terminal may have high transmission rate and low delay to perform data communication. Further, the D2D operation may distribute traffic concentrated to an eNB. If the terminal performing the D2D operation functions as a relay, the terminal may extend coverage of the eNB. Communication associated with vehicles including signal transmission/reception between vehicles due to extension of the D2D communication refers to Vehicle-to-X (V2X) communication.

Here, for example, the term 'X' of the V2X (VEHICLE-TO-X) means PEDESTRIAN (COMMUNICATION BETWEEN A VEHICLE AND A DEVICE CARRIED BY AN INDIVIDUAL (example) HANDHELD TERMINAL CARRIED BY A PEDESTRIAN, CYCLIST, DRIVER OR PASSENGER)) (V2P), VEHICLE (COMMUNICATION BETWEEN VEHICLES) (V2V), INFRASTRUCTURE/NETWORK (COMMUNICATION BETWEEN A VEHICLE AND A ROADSIDE UNIT (RSU)/NETWORK (예) RSU IS A TRANSPORTATION INFRASTRUCTURE ENTITY (example) AN ENTITY TRANSMITTING SPEED NOTIFICATIONS) IMPLEMENTED IN AN eNB OR A STATIONARY UE)) (V2I/N). Further, for example, for convenience of the description of a suggested method, a (V2P communication) device of a pedestrian (or person) refers to "P-UE". A (V2P communication) device installed at a vehicle refers to "V-UE". In addition, for example, in the present invention, the term 'ENTITY' may be interpreted as P-UE and/or V-UE and/or RSU(/NETWORK/INFRASTRUCTURE).

The terminal providing (supporting) the above D2D operation may refer to a D2D terminal. The terminal providing (supporting) the above V2X operation may refer to a V2X terminal. Hereinafter, for convenience of the description, although embodiments of the present invention are described in a V2X aspect, contents of a corresponding V2X terminal are applicable to the D2D terminal.

As described above, when a problem occurs at RRC connection, the terminal performs a procedure to recover the problem. For example, if a radio link failure occurs, the terminal performs an RRC connection re-establishment procedure. In this case, it takes a long time for the terminal to perform a RRC connection re-establishment procedure in order to recover the RRC connection. The time taken for the terminal to perform the RRC connection re-establishment procedure may not be a minor time. As another example, when the terminal changes a serving cell due to mobility of the terminal or variation of a channel situation, a RRC connection problem may occur. For example, while the RRC connected terminal performs handover, communication between the terminal and the eNB stops.

For a time taken to recover the connection, since the terminal has shortage in a resource (for example, V2X grant transmission resource) for V2X transmission, the terminal may be forbidden (limited) to perform V2X transmission. Here, if the terminal may perform V2X transmission in an idle mode or the terminal may initially enter a connection mode (after entering the RRC idle mode) to perform the V2X transmission, it may be preferred that the terminal rapidly enters the RRC idle mode as soon as the terminal detects a connection failure.

Accordingly, the present invention provides 1. A method regarding how to perform V2X transmission by the terminal while attempting recovery of the RRC connection and 2. A method regarding which scheme performs V2X transmission when the terminal fails RRC recovery to enter an RRC idle mode.

The present invention provides 1. A method regarding how to perform V2X transmission while an RRC re-establishment procedure is initiated to attempt RRC connection and 2. A method regarding which scheme performs V2X transmission when the terminal fails RRC recovery to enter an RRC idle mode as main example when a problem occurs at RRC connectivity.

In particular, the present invention provides 2.1. A method of performing V2X transmission by the terminal when the terminal enters an RRC idle mode and 2.2. A method of rapidly attempting RRC connection by the terminal when the terminal enters a RRC idle mode to perform V2X transmission in a rapid RRC connection state with respect to 2. A method regarding which scheme performs V2X transmission when the terminal fails RRC recovery to enter an RRC idle mode The V2X transmission method according to the present invention may be used to allow V2X transmission upon the RRC connection re-establishment procedure and transmission of the terminal is generally impossible, for example, when the terminal performs handover.

1. A method of performing V2X transmission by a terminal when an RRC re-establishment procedure is initiated to attempt RRC connection.

Figure 13:
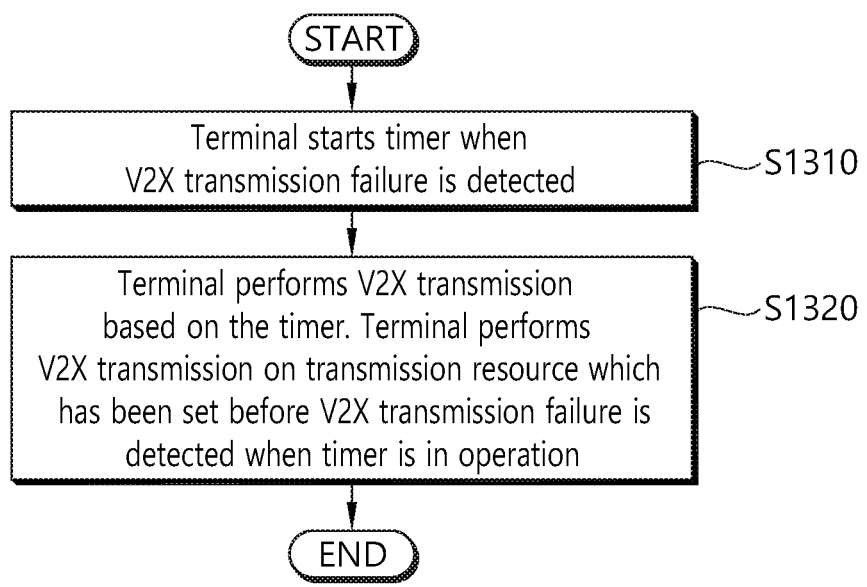
FIG. 13 is a flowchart illustrating a method of performing V2X transmission by a terminal when a V2X transmission failure is detected according to an embodiment of the present invention.

FIG. 13 is a flowchart illustrating a method of performing V2X transmission by a terminal when a V2X transmission failure is detected according to an embodiment of the present invention.

As shown in FIG. 13, when a V2X transmission failure is detected, a terminal may start a timer (S1310). In this case, the V2X transmission failure may include a radio link failure. Further, the V2X transmission failure may include handover.

Here, the timer may a timer (e.g., T311_V2X) to which a value different from that of an existing T311 timer is set. That is, in order to correctly change the terminal to an idle state as soon as radio connection fails, when a condition initiating an RRC connection re-establishment procedure is satisfied while the terminal is in a V2X transmission mode, the terminal may initiate the RRC connection re-establishment based on a timer (for example, T311_V2X) having a value different from that of a T311 timer (if a timer having a value different from that of a T311 timer). Here, as described above, a preferred situation of the terminal to rapidly enter an RRC idle mode may include a case where the terminal may perform V2X transmission in an idle mode or a case where the terminal rapidly reenters a connection mode from an idle mode to perform V2X transmission. A detailed example with respect to a case where the timer is expired will be described below.

However, in the present invention, a timer (e.g., T311_V2X) set to a value different from that of the T311 timer is not always applied to the timer. That is, the timer may include the T311 timer. However, the present invention does not exclude a case where the above timer is the T311 timer from the right of the present invention.

The network may configure the above T311_V2X in the terminal through dedicated signaling. The signaling may include broadcast signaling or terminal dedicated signaling. The network may signal a T311_V2X value in the terminal or may signal a T311_V2X_OFFSET value in the terminal. When the T311_V2X_OFFSET value is used, a terminal performing V2X uses a sum of a general T311 value and the T311_V2X_OFFSET value as T311. It may be preferred that the T311_V2X value is shorter than the general T311 value. As described above, a reason why the T311_V2X value is shorter than the general T311 value is because it may be preferred to rapidly enter an RRC idle mode. Here, the T311_V2X may be zero. The T311_V2X may mean that the terminal directly enters an RRC idle mode instead that the terminal does not transmit a RRC connection re-establishment request (e.g., RRCCConnectionReestablishmentRequest) as soon as a condition initiating the RRC connection re-establishment is satisfied. That is, as soon as the terminal discovers (or detects) the radio connection failure case, the terminal may rapidly enter the RRC idle mode.

Meanwhile, the T311_V2X is set longer than the general T311. Such a setting may be used when the terminal minimizes failure of RRC connection re-establishment by long ensuring a time to be used to discover a suitable cell. As described below, when there is a method capable of continuously performing V2X transmission during performing RRC connection re-establishment, to set a long T311_V2X may not deteriorate a V2X service maintenance aspect. However, during the RRC connection re-establishment, it may be considered that general user traffic except for a V2X service and a situation difficult to receive a control signal of an eNB occur.

If the present invention is used to recover a V2X transmission stop problem according to handover, the timer may include a T304. That is, a T304_V2X used by a terminal performing V2X may be introduced.

The terminal performs V2X transmission based on the timer. When the timer is in operation, the terminal may perform the V2X transmission on a transmission resource which has been set before the V2X transmission failure is detected (S1320). In this case, as soon as a Radio Resource Control (RRC) connection re-establishment procedure is initiated, the timer starts. When the timer is in operation and the RRC connection re-establishment procedure is initiated, the terminal performs the V2X transmission on a transmission resource which has been set before the V2X transmission failure is detected. Alternatively, as soon as the handover procedure is initiated, the timer starts. When the timer is in operation and the handover procedure is initiated, the terminal performs the V2X transmission on a transmission resource which has been set before the handover procedure is performed.

Here, the V2X transmission may means as follows.

(1) A set state of a transmission resource for V2X transmission in the terminal by an eNB or a set state of V2X transmission by MME;

1) The V2X transmission includes (covers) uplink transmission and sidelink transmission.

2) V2X transmission resources may be grants periodically and/or half-periodically set together with periodic and/or half-periodic transmission resource.

(2) An authorized state of the terminal so that the terminal performs V2X transmission by an upper layer;

(3) A state where the terminal instructs interest information (requesting V2X transmission resource by the terminal in order to perform V2X transmission) and auxiliary information, and the terminal receives authorization and/or V2X transmission configuration through dedicated signaling;

(4) A set state of a specific logic channel (e.g., a channel dedicated to a radio bearer for V2X)

1) The V2X transmission may mean a state that a specific logic channel (e.g., a channel dedicated to a radio bearer for specific service (e.g., V2X) is set when this is generalized.

(5) A set state of a periodically scheduled resource (e.g., SPS resource) allowed so that the network cause the terminal to perform operations of the above and following method; and/or (6) The V2X transmission may mean a set state of a periodically scheduled resource (e.g., SPS resource) for a specific (e.g., V2X).

In the present invention, a V2X transmission mode may be used for another objective. In the present case, a name of the timer may refer to T311 exceptional. Accordingly, since the V2X transmission mode may be used for another objective, the V2X transmission mode may be configured for a specific service and/or application, a specific logic channel, or data transmission corresponding to a specific PDN. The present mode is not limited to only a case used in V2X. That is, the present mode is illustrative purpose only to easily describe the present invention.

(While a T311 and/or a T311_V2X runs, that is, the timer runs), when the terminal performs the V2X transmission on a configured resource, a resource for V2X transmission used by the terminal may be as follows.

(1) Resources (e.g., SPS resources) periodically scheduled with respect to uplink and/or downlink assigned by a final serving cell before radio connection failure.

(2) Resources (e.g., SPS resources) periodically scheduled with respect to uplink and/or downlink assigned by one of serving cells before radio connection failure. In this case, the resources may include resources applicable to one or more cells configured by one of previous serving cells or a network.

(3) Resource configured by the terminal to select a transmission resource every period in a resource pool configured to be periodically indicated with respect to uplink and/or downlink assigned by the final serving cell before radio connection failure.

(4) Contention based on PUSCH resources. In this case, the PUSCH resources allow certain terminals in which the PUSCH resources are set to transmit uplink data together with a latent contention (considered as resources to be used by other terminals). The present PUSCH resource may be periodically generated with respect to terminals.

(5) Contention based on PUSCH resources. In this case, the PUSCH resources allow certain terminals in which the PUSCH resources are set to transmit downlink data together with a latent contention (considered as resources to be used by other terminals). The present PUSCH resource may be periodically generated with respect to terminals.

(6) Preset transmission resource corresponding to resources set by an upper layer (e.g., OMA DM) in an RRC aspect allowed so that the terminal uses at handover.

When the terminal performs the V2X transmission on a preset resource while performing the handover, a resource for V2X transmission used by the terminal may be as follows.

(1) Resources (e.g., SPS resources) periodically scheduled with respect to uplink and/or downlink assigned by a serving cell instructing the handover.

(2) Resources (e.g., SPS resources) periodically scheduled with respect to uplink and/or downlink assigned by one of serving cells instructing the handover. In this case, the resources may include resources applicable to one or more cells set by one of previous serving cells or a network.

(3) Resource set by the terminal to select a transmission resource every period in a resource pool configured to be periodically indicated with respect to uplink and/or downlink assigned by a serving cell instructing the handover.

(4) Contention based on PUSCH resources. In this case, the PUSCH resources allow certain terminals in which the PUSCH resources are set to transmit uplink data together with a latent contention (considered as resources to be used by other terminals). The present PUSCH resource may be periodically generated with respect to terminals.

(5) Contention based on PUSCH resources. In this case, the PUSCH resources allow certain terminals in which the PUSCH resources are set to transmit downlink data together with a latent contention (considered as resources to be used by other terminals). The present PUSCH resource may be periodically generated with respect to terminals.

(6) Preset transmission resource corresponding to resources set by an upper layer (e.g., OMA DM) in an RRC aspect allowed so that the terminal uses at handover.

As described above, the terminal may perform V2X transmission using a resource assigned by a final serving cell before a radio connection failure during an RRC re-establishment procedure or a resource assigned by one of serving cells before the radio connection failure. In this case, when the timer (e.g., T311 or T311_V2X) is expired so the terminal escapes from the RRC connection state, the terminal enters an RRC idle mode. There may be a problem which scheme performs the V2X transmission in an RRC idle state. Accordingly, when the terminal fails the RRC connection to enter the RRC idle mode, the following is a description with respect to which scheme performs the V2X transmission.

2. When the terminal fails the RRC connection to enter the RRC idle mode, 2.1. A method of performing V2X by the terminal when the terminal enters an RRC idle mode.

Figure 14:
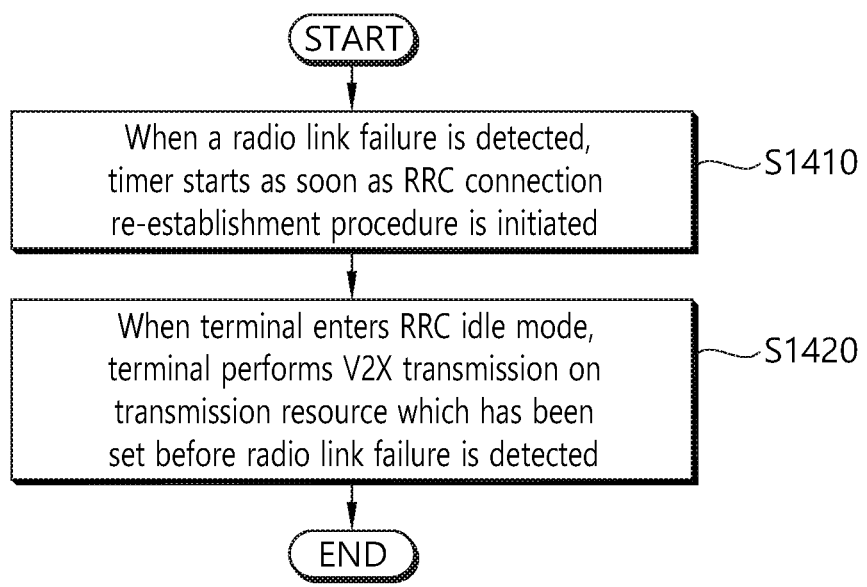
FIG. 14 is a flowchart illustrating a method of performing V2X transmission when the terminal enters an RRC idle mode according to an embodiment of the present invention.

FIG. 14 is a flowchart illustrating a method of performing V2X transmission when the terminal enters an RRC idle mode according to an embodiment of the present invention.

As shown in FIG. 14, when a radio link failure is detected, a timer starts as soon as a RRC connection re-establishment procedure is initiated (S1410).

Here, the timer may be described above. The timer may a timer (e.g., T311_V2X) to which a value different from that of an existing T311 timer is set. That is, in order to correctly change the terminal to an idle state as soon as radio connection fails, when a condition initiating an RRC connection re-establishment procedure is satisfied while the terminal is in a V2X transmission mode, the terminal may initiate the RRC connection re-establishment based on a timer (for example, T311_V2X) having a value different from that of a T311 timer (if a timer having a value different from that of a T311 timer). Here, as described above, a preferred situation of the terminal to rapidly enter an RRC idle mode may include a case where the terminal may perform V2X transmission in an idle mode or a case where the terminal rapidly reenters a connection mode from an idle mode to perform V2X transmission.

However, in the present invention, a timer (e.g., T311_V2X) set to a value different from that of the T311 timer is not always applied to the timer. That is, the timer may include the T311 timer. However, the present invention does not exclude a case where the above timer is the T311 timer from the right of the present invention.

The network may configure the above T311_V2X in the terminal through dedicated signaling. It may be preferred that the T311_V2X value is shorter than the general T311 value. As described above, a reason why the T311_V2X value is shorter than the general T311 value is because it may be preferred to rapidly enter an RRC idle mode. Here, the T311_V2X may be zero. The T311_V2X may mean that the terminal directly enters an RRC idle mode instead that the terminal does not transmit a RRC connection re-establishment request (e.g., RRCCConnectionReestablishmentRequest) as soon as a condition initiating the RRC connection re-establishment is satisfied. That is, as soon as the terminal discovers (or detects) the radio connection failure case, the terminal may rapidly enter the RRC idle mode.

Alternatively, a timer (e.g., T301_V2X) may be a timer (e.g., T301_V2X) set to a value different from that of the existing T301 timer. That is, the network may configure a timer applicable to the terminal in a V2X transmission mode. When the RRC connection re-establishment procedure is performed, a terminal in the V2X transmission mode may apply a T301_V2X. If the timer extends to another use case, the timer may refer to T301_exceptional.

When the timer is expired, the terminal enters an RRC idle mode. When the terminal enters the RRC idle mode, the terminal may perform V2X transmission on a transmission resource which has been set before the radio link failure is detected (S1420). In this case, a detailed example of the V2X transmission (or V2X transmission mode) is described as above.

In detail, when the terminal escapes from the RRC connection mode to enter the RRC idle mode, as soon as the terminal in the V2X transmission mode detects the radio connection failure, the terminal may maintain configuration (e.g., a dedicated configuration, a configuration including system information on a cell before the radio connection failure is detected). The configuration of the terminal may include V2X transmission resources and a related V2X configuration.

In this case, the related V2X configuration may be a configuration associated with the V2X which may transmit a V2X message although the terminal is in the RRC idle mode.

Although the terminal is in the RRC idle mode, when the terminal performs the V2X transmission on a preset resource, a resource for the V2X transmission used by the terminal may be as follows.

(1) Resources (e.g., SPS resources) periodically scheduled with respect to uplink and/or downlink assigned by a final serving cell before radio connection failure.

(2) Resources (e.g., SPS resources) periodically scheduled with respect to uplink and/or downlink assigned by one of serving cells before radio connection failure. In this case, the resources may include resources applicable to one or more cells configured by one of previous serving cells or a network.

(3) Resource set by the terminal to select a transmission resource every period in a resource pool configured to be periodically indicated with respect to uplink and/or downlink assigned by the final serving cell before radio connection failure.

(4) Contention based on PUSCH resources. In this case, the PUSCH resources allow certain terminals in which the PUSCH resources are set to transmit uplink data together with a latent contention (considered as resources to be used by other terminals). The present PUSCH resource may be periodically generated with respect to terminals.

(5) Contention based on PUSCH resources. In this case, the PUSCH resources allow certain terminals in which the PUSCH resources are set to transmit downlink data together with a latent contention (considered as resources to be used by other terminals). The present PUSCH resource may be periodically generated with respect to terminals.

(6) Preset transmission resource corresponding to resources set by an upper layer (e.g., OMA DM) in an RRC aspect allowed so that the terminal uses at handover.

2.2. Method of performing V2X transmission by rapidly restarting a RRC connection by the terminal when the terminal enters the RRC idle mode.

Figure 15:
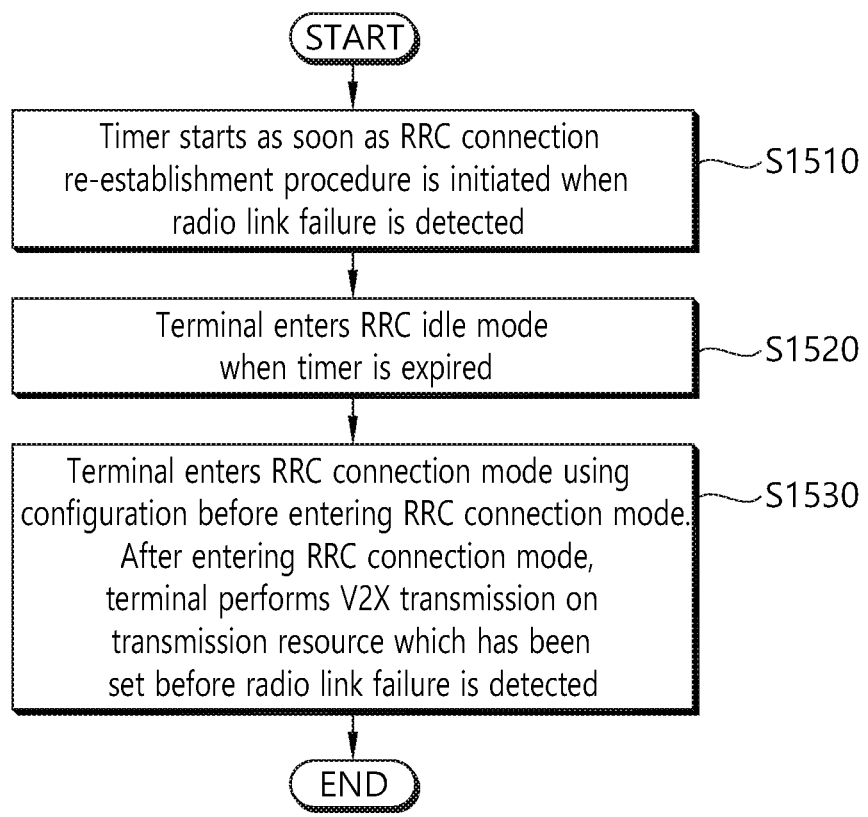
FIG. 15 is a flowchart illustrating a method of performing V2X transmission by restarting the RRC connection by the terminal.

FIG. 15 is a flowchart illustrating a method of performing V2X transmission by restarting the RRC connection by the terminal.

As shown in FIG. 14, when a radio link failure is detected, a timer starts as soon as a RRC connection re-establishment procedure is initiated (S1510). In this case, as described above, the timer may correspond to T311, T311_V2X, T301, or T301_V2X. A detailed content of the timer is described as above.

When the timer is expired, the terminal may enter the RRC idle mode (S1520).

In detail, when the terminal escapes from the RRC connection mode to enter the RRC idle mode, as soon as the terminal in the V2X transmission mode detects the radio connection failure, the terminal may maintain configuration (e.g., a dedicated configuration, a configuration including system information on a cell before the radio connection failure is detected). The configuration of the terminal may include V2X transmission resources and a related V2X configuration.

In this case, the related V2X configuration may include a configuration associated with the V2X to transmit the V2X message after completion of RRC connection restart (that is, rapid connection mode transmission). In this case, restart of the RRC connection may be performed by restarting a stored configuration.

Next, the terminal enters a RRC connection mode using a configuration before entering the RRC connection mode. After entering the RRC connection mode, the terminal may perform the V2X transmission on the transmission resource which has been set before the radio link failure is detected (S1530). In this case, a detailed example of the V2X transmission (or V2X transmission mode) is described as above.

In the above embodiments, when the terminal escapes from the RRC connection mode, an AS layer of the terminal may not report to an NAS layer of the terminal that the connection fails. If the above is determined, when the terminal is in the RRC idle mode, the terminal may still be in an ECM connection mode.

When an eNB reports that instant connection is set through dedicate signaling or system information, the terminal may perform instant start of the RRC re-establishment procedure by transmission of the RRC connection request message, instant start of an RRC connection re-establishment by transmission of the RRC connection re-establishment request message, and instant start of an RRC connection restart procedure by transmission of the RRC connection start request message as soon as the terminal escapes from the RRC connection mode. The above messages may include a C-RNTI of a terminal and a Cell ID of a cell. The above messages may include a configuration ID of the terminal. The configuration ID is an ID specifying a configuration of a corresponding terminal, and is distinguished from an ID of another terminal. The Configuration ID is an ID to identify a configuration of a connected mode terminal included in at least a cell. The Configuration ID may identify a configuration of a connected mode terminal included in a plurality of cells. If the eNB previously include a database regarding terminal configuration information corresponding to each configuration ID, a eNB receiving the message may combine the configuration ID with the Cell ID to recognize a recent configuration of a corresponding terminal. The cell may include a cell corresponding to a cell assigning the C-RNTI or a final service cell in which a connection failure is generated.

As another method of rapidly performing connection restart, when the terminal escapes from the RRC connection mode, an AS layer of the terminal may report to an NAS layer that connection fails and instead connection restart is rapidly performed. As soon as an NAS receives failure and/or start instruction with respect to the above V2X, (when the terminal is in a V2X transmission mode), the NAS may immediately start RRC connection establishment, RRC connection re-establishment procedure, or an RRC connection start procedure in order to start a previous RRC connection start. In this case, while the terminal is in a RRC idle, the terminal may still maintain an ECM connection state.

The above embodiments may be independently performed or a combination thereof may be performed. An example of performing a combination of the above embodiment is as follows.

Figure 16:
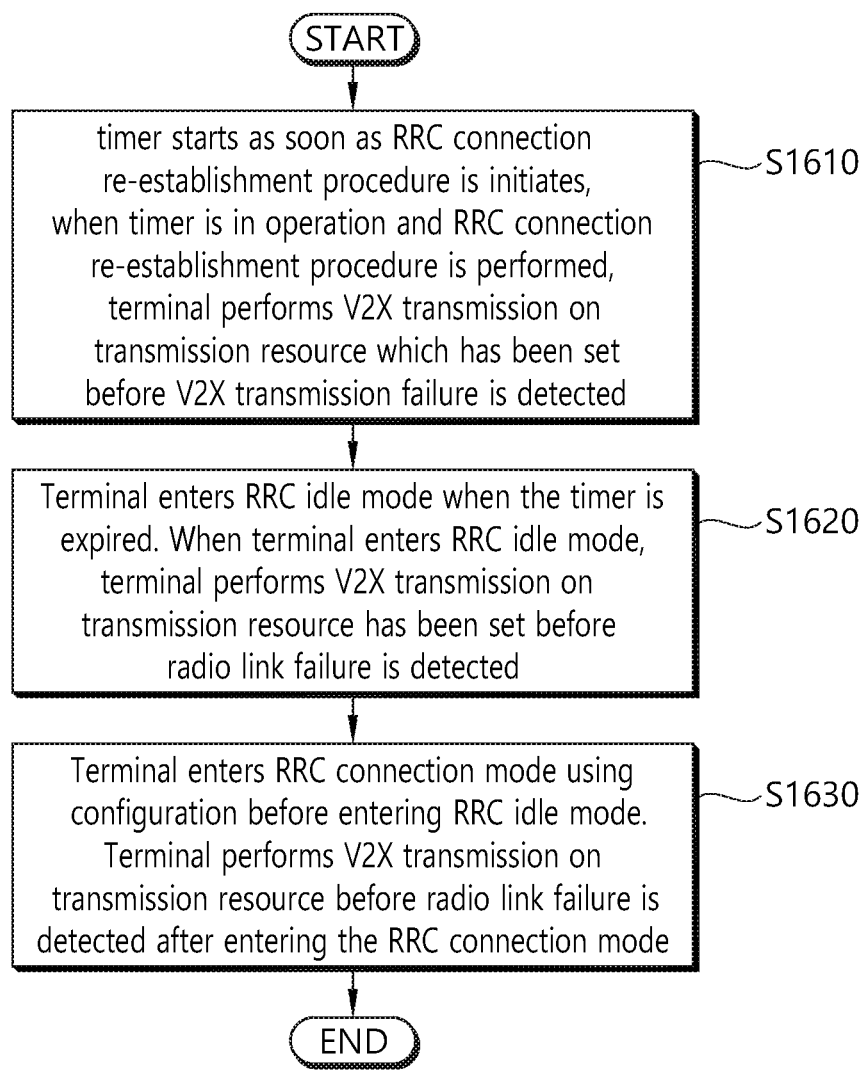
FIG. 16 is a flowchart illustrating a method of performing a V2X transmission by a terminal according to an embodiment of the present invention.

FIG. 16 is a flowchart illustrating a method of performing a V2X transmission by a terminal according to an embodiment of the present invention.

Referring to FIG. 16, as soon as a RRC connection re-establishment procedure is initiates, the timer starts. When the timer is in operation and the RRC connection re-establishment procedure is performed, the terminal performs the V2X transmission on a transmission resource which has been set before the V2X transmission failure is detected (S1610). Here, a detailed example of the timer is described as above, and a detailed example of performing V2X transmission on a preset resource when the timer is in operation is described as above, for convenience of the description, the repetition in the description will be omitted.

When the timer is expired, the terminal enters a RRC idle mode. When the terminal enters a RRC idle mode, the terminal may perform the V2X transmission on the transmission resource which has been set before the radio link failure is detected (S1620). Here, since a detailed example of performing V2X transmission based on a preset resource in an RRC idle mode is described as above, for convenience of the description, the repetition in the description will be omitted.

The terminal enters an RRC connection mode using a configuration before entering the RRC idle mode. After entering the RRC connection mode, the terminal may perform V2X transmission on a transmission resource which has been set before the radio link failure is detected (S1630). Here, since a detailed example of performing V2X transmission by the terminal based on V2X configuration before entering the RRC idle mode after entering the RRC connection mode.

Figure 17:
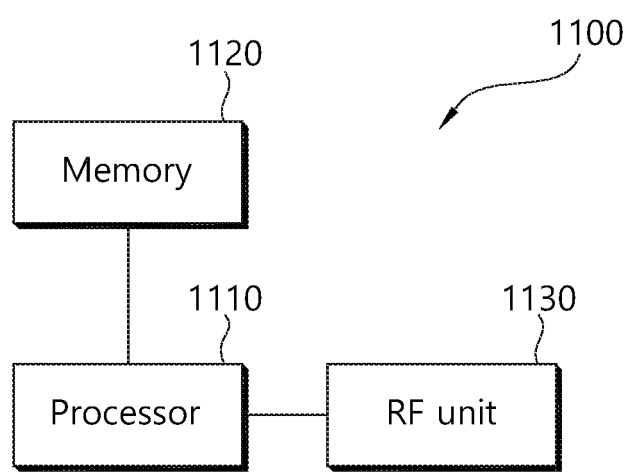
FIG. 17 is a block diagram illustrating a terminal according to an embodiment of the present invention.

FIG. 17 is a block diagram illustrating a terminal according to an embodiment of the present invention.

Referring to FIG. 17, a terminal 1100 includes a processor 1110, a memory 1120, and an RF unit 1130. A timer stars as soon as an RRC connection re-establishment procedure is initiated. When the timer is in operation and the RRC connection re-establishment procedure is performed, the processor 1110 of the terminal may perform the V2X transmission on a transmission resource has been set before the radio link failure is detected. When the timer is expired, the processor 1110 enters an RRC idle mode. When the processor 1110 enters an RRC idle mode, the processor 1110 of the terminal may perform V2X transmission on a transmission resource which has been set before the radio link failure is detected. The processor 1110 enters a RRC connection mode using a configuration before entering the RRC idle mode. After entering the RRC connection mode, the processor 1110 may perform V2X transmission on a transmission resource which has been set before the radio link failure is detected.

The RF unit 1130 is connected to the processor 1110, and sends and receives radio signals.

The processor may include Application-Specific Integrated Circuits (ASICs), other chipsets, logic circuits, and/or data processors. The memory may include Read-Only Memory (ROM), Random Access Memory (RAM), flash memory, memory cards, storage media and/or other storage devices. The RF unit may include a baseband circuit for processing a radio signal. When the above-described embodiment is implemented in software, the above-described scheme may be implemented using a module (process or function) which performs the above function. The module may be stored in the memory and executed by the processor. The memory may be disposed to the processor internally or externally and connected to the processor using a variety of well-known means.

What is claimed is:

1. A method for performing vehicle-to-X (V2X) operation in a wireless communication system, the method performed by a user equipment (UE) and comprising:
starting a V2X timer related to the V2X operation when a radio link failure (RLF) is detected,
wherein the V2X timer expires before an RLF timer T311 expires,
wherein the UE performs the V2X operation with another UE based on a specific resource configured before detecting the RLF;
entering a radio resource control (RRC) idle state from a RRC connected state when the V2X timer expires;
performing the V2X operation with the another UE in the RRC idle state,
wherein, in the RRC idle state, performing the V2X operation on the specific resource which is configured in the RRC connected state before the RLF is detected;

entering the RRC connected state using a configuration before entering the RRC idle state; and after entering the RRC connection state, performing the V2X operation with the another UE on the transmission resource which has been set before the RLF is detected, wherein the UE is in an Evolved packet system Connection Management (ECM) connected state while the UE is in the RRC idle state.

2. The method of claim 1, wherein the V2X timer starts upon initiating the RRC connection re-establishment procedure.

3. The method of claim 1, wherein the V2X timer is configured through dedicated signaling from a network.

4. The method of claim 1, wherein when the RLF is detected, an access stratum (AS) layer of the UE does not report that the radio link failure is detected to a non-access stratum (NAS) of the UE.

5. A user equipment (UE) for performing vehicle-to-X (V2X) operation comprising:

an RF transceiver configured to send and receive radio signals; and a processor connected to the RF transceiver to be operated, wherein the processor is configured to:

start a V2X timer related to the V2X operation when a radio link failure (RLF) is detected, wherein the V2X timer expires before an RLF timer T311 expires, wherein the UE performs the V2X operation with another UE based on a specific resource configured before detecting the RLF;

enter a radio resource control (RRC) idle state from a RRC connected state when the V2X timer expires;

perform the V2X operation with the another UE in the RRC idle state, wherein, in the RRC idle state, the UE performs the V2X operation on the specific resource which is configured in the RRC connected state before the RLF is detected, enter the RRC connected state using a configuration before entering the RRC idle state; and after entering the RRC connection state, perform the V2X operation with the another UE on the transmission resource which has been set before the RLF is detected, wherein the UE is in an Evolved packet system Connection Management (ECM) connected state while the UE is in the RRC idle state.

* * * * *